United States Patent
Chakraborty et al.

(10) Patent No.: US 9,009,074 B2
(45) Date of Patent: Apr. 14, 2015

(54) SYSTEMS AND METHODS FOR GENERATING ELECTRONIC SPARE PARTS CATALOGS FOR COMPLEX SYSTEMS AND MACHINES

(75) Inventors: Amit Chakraborty, Cranbury, NJ (US); Liang H. Hsu, Irvine, CA (US); Zhijing Liu, Audubon, PA (US); Jan Eggebrecht, Berlin (DE)

(73) Assignees: Siemens Aktiengesellschaft, Munich (DE); Siemens Corporation, Iselin, NJ (US)

( * ) Notice: Subject to any disclaimer, the term of this patent is extended or adjusted under 35 U.S.C. 154(b) by 2029 days.

(21) Appl. No.: 11/215,913

(22) Filed: Aug. 31, 2005

(65) Prior Publication Data

US 2006/0167711 A1    Jul. 27, 2006

Related U.S. Application Data

(60) Provisional application No. 60/646,784, filed on Jan. 25, 2005.

(51) Int. Cl.
| | |
|---|---|
| G06Q 10/08 | (2012.01) |
| G06Q 99/00 | (2006.01) |
| G06F 17/24 | (2006.01) |
| G06Q 30/06 | (2012.01) |

(52) U.S. Cl.
CPC .............. *G06Q 99/00* (2013.01); *G06F 17/243* (2013.01); *G06F 17/248* (2013.01); *G06Q 30/0601* (2013.01)

(58) Field of Classification Search
USPC .............. 703/35; 705/1, 4, 26, 27, 29, 34, 80, 705/35–45; 707/100
See application file for complete search history.

(56) References Cited

U.S. PATENT DOCUMENTS

| | | | | |
|---|---|---|---|---|
| 5,146,404 | A | * | 9/1992 | Calloway et al. ............... 705/1.1 |
| 5,367,627 | A | * | 11/1994 | Johnson ......................... 715/708 |
| 5,615,342 | A | | 3/1997 | Johnson |
| 6,341,271 | B1 | * | 1/2002 | Salvo et al. ...................... 705/28 |
| 6,901,377 | B1 | * | 5/2005 | Rosenfeld et al. ............... 705/26 |
| 7,257,585 | B2 | * | 8/2007 | Stevenson et al. ............ 707/809 |
| 2002/0007335 | A1 | * | 1/2002 | Millard et al. ................... 705/37 |
| 2002/0055893 | A1 | * | 5/2002 | Mizumachi et al. ............ 705/29 |
| 2002/0087439 | A1 | * | 7/2002 | Lambert et al. ................. 705/29 |
| 2003/0014329 | A1 | * | 1/2003 | Weisman et al. ................ 705/26 |
| 2004/0064381 | A1 | * | 4/2004 | Mizumachi et al. ............ 705/27 |
| 2004/0103016 | A1 | * | 5/2004 | Ho et al. ............................ 705/8 |
| 2004/0177024 | A1 | * | 9/2004 | Bok et al. ......................... 705/37 |
| 2005/0086179 | A1 | * | 4/2005 | Mehmet .......................... 705/80 |
| 2005/0125261 | A1 | * | 6/2005 | Adegan ............................. 705/4 |
| 2005/0131783 | A1 | * | 6/2005 | Jin .................................. 705/34 |
| 2006/0053071 | A1 | * | 3/2006 | Yamada et al. ................. 705/29 |
| 2006/0129461 | A1 | * | 6/2006 | Pankl et al. ..................... 705/26 |
| 2007/0100734 | A1 | * | 5/2007 | Berger et al. ................... 705/37 |
| 2007/0162288 | A1 | * | 7/2007 | Springhart et al. ............... 705/1 |
| 2007/0219898 | A1 | * | 9/2007 | Burkhardt et al. .............. 705/37 |
| 2007/0282709 | A1 | * | 12/2007 | Rupp ............................... 705/27 |

* cited by examiner

*Primary Examiner* — Robert R Niquette

(57) ABSTRACT

Systems and methods are provided for generating and publishing electronic spare parts catalogs that support electronic business processes for managing and selling spare parts for complex machines and systems, such as gas turbines. Automated systems and methods for generating electronic catalogs of spare parts employ an extensible, template-based framework to extract and integrate catalog content (static and/or real-time spare parts data) from various backend business information systems and data sources.

26 Claims, 27 Drawing Sheets

SYSTEMS AND METHODS FOR GENERATING ELECTRONIC SPARE PARTS CATALOGS FOR COMPLEX SYSTEMS AND MACHINES

This application claims priority to U.S. Provisional Application Ser. No. 60/646,784, filed on Jan. 25, 2005, which is herein incorporated by reference in its entirety.

TECHNICAL FIELD OF THE INVENTION

The present invention relates generally to automated systems and methods for generating and publishing spare parts information to support electronic business processes for managing and selling spare parts for complex machines and systems, such as gas turbines. More specifically, the present invention relates to automated systems and methods for generating electronic catalogs of spare parts using an extensible, template-based framework to extract and integrate catalog content (static and/or real-time spare parts data) from various backend business information systems and data sources.

BACKGROUND

Electronic commerce on the Internet is becoming increasingly popular and many companies and enterprises are migrating towards Internet-based B2B (business to business) procurement for conducting e-business activities. For example, supply chain management e-commerce applications allow integration of participants in a supply chain (e.g., vendors, distributors, resellers customers, etc.) to publish information about their products, prices and availability. Such applications facilitate operational business decisions of the supply chain participants, leading to decreased business operational costs and increased competitive power.

One of the most lucrative and yet challenging types of e-business activity consists of managing and selling spare parts for complex machines and equipment in industries such as heavy equipment manufacturing (e.g., gas turbines). Conventional sales channels for conducting business for spare parts includes publishing paper catalogs containing spare part information that enables customers to determine the spare parts necessary for equipment repair and maintenance. However, conducting sales over non-electronic media is time consuming, cumbersome, and expensive. For critical infrastructure installations such as power generation, conducting business electronically would be cost-effective and afford added convenience for suppliers and customers. For example, e-business would help a supplier with the management and maintenance of spare parts, and help a customer with real-time access to information such as price and availability of required spare parts.

The development of e-commerce applications that support spare parts business activity for complex machines is not trivial. For example, heavy equipment such as gas turbines are very complex structures, and the categories of data related to such machines are very complicated. Moreover, spare parts information for complex machines is typically located across disparate business information systems and data repositories, which makes it difficult to integrate such information. Furthermore, some complex machines such as gas turbines can last for more than 30 years. In such instance, e-business applications that support management and sale of spare parts for complex machines should be flexible and extensible to be able to bridge between legacy documents and new or future electronic data and content sources, to thereby provide comprehensive spare parts information and content needed to support such e-business applications.

SUMMARY OF THE INVENTION

In general, exemplary embodiments of the invention include automated systems and methods for generating and publishing electronic spare parts catalogs to support electronic business processes for managing and selling spare parts for complex machines and systems, such as gas turbines. More specifically, exemplary embodiments of the invention include automated systems and methods for generating electronic spare parts catalogs using an extensible, template-based framework to extract and integrate catalog content (static and/or real-time spare parts data) from various backend business information systems and data sources. The electronic spare parts catalogs can be rendered into a suitable presentation modality (e.g., HTML) to provide a navigable user interface for on-line browsing and retrieving of spare parts information, as well as initiating sales transactions.

More specifically, in one exemplary embodiment of the invention, a method for generating a business application for managing and selling spare parts is provided. The exemplary method includes applying a catalog template to one or more disparate sources of spare part data to automatically extract spare parts data according to catalog template specifications and generating spare parts catalog content by integrating the extracted spare parts data into one or more common formats according to the catalog template specifications. The spare parts catalog content is published to an application database.

In one exemplary embodiment of the invention, the catalog template is an XML template and the catalog content is represented by a plurality of linked XML documents. The catalog template can be applied to one or more backend information business information systems (e.g., ERP systems) to extract various types of spare parts data.

In another exemplary embodiment, the spare parts catalog content is generated by generating a spare parts document for each component of a machine unit a TOC (table of contents) document for the spare parts documents. The spare parts document for each component is an XML file that describes the component and includes information regarding subcomponents of the component, and the TOC document is an XML file that includes an index of the spare parts documents for the machine unit. The spare parts documents can be generated by extracting BOM (Bill of Material) information associated with the machine unit from a structured data source. A top level document is also generated for the machine unit, wherein the top level document is an XML file that includes an index of all files that are associated with the machine unit.

In another exemplary embodiment of the invention, the spare parts documents are grouped together based on electronic survey drawings associated with the machine unit, from which graphical illustrations are created for spare parts components of the machine unit. The spare parts catalog content includes meta information to support hyperlinked navigation between spare part components and the corresponding graphic illustrations.

In other exemplary embodiments of the invention, one or more business logic programs are generated that enable user interaction with the spare part catalog content including, for example, user navigation and retrieval of spare parts data, requesting quotes and availability of spare parts and ordering spare parts. The business logic programs support real-time access of spare parts information from backend business information systems such as sales ERP systems.

These and other exemplary embodiments, aspects, features and advantages of the present invention will be described or become apparent from the following detailed description of exemplary embodiments, which is to be read in connection with the accompanying drawings.

BRIEF DESCRIPTIONS OF THE DRAWINGS

Figure 1:
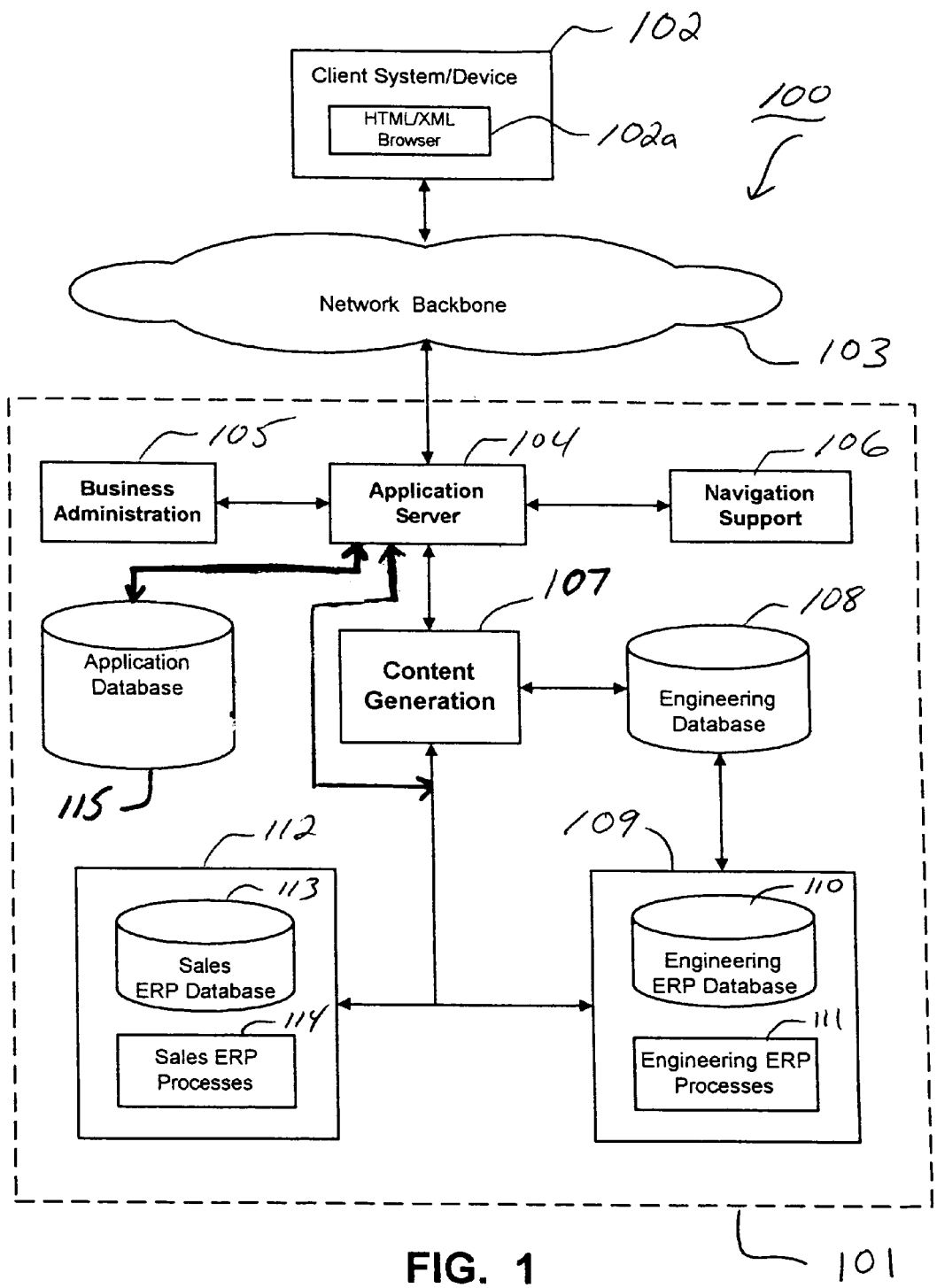
FIG. 1 illustrates a system for supporting electronic business transactions for managing and selling spare parts for complex equipment and machines according to an exemplary embodiment of the invention.

FIGS. 14A~14G are diagrams that illustrate various application pages that are presented to a user for on-line navigation, searching and retrieval of spare parts content, according to exemplary embodiments of the invention.

DETAILED DESCRIPTION OF EXEMPLARY EMBODIMENTS

In general, exemplary embodiments of the invention as described herein include systems and methods for implementing electronic business applications for managing and selling spare parts for complex equipment and machines. For ease of reference, the following description of exemplary embodiments is divided into various sections. For instance, Section I provides a general overview of systems and methods according to exemplary embodiments of the invention that support e-business transactions with regard to managing and selling spare parts for complex equipment and machines, such as gas turbines. As will be explained in further detail below, e-business systems and methods according to exemplary embodiments of the invention are implemented using an extensible, modality-independent application framework (such as XML), which provides functionality for enabling user access to comprehensive spare parts information (such as static engineering data, real-time sales information, and other types of information) extracted from one or more backed data sources or legacy business information systems, such as enterprise ERP systems and databases, as well as communication with the backend systems for requesting quotes and ordering spare parts, etc. More specifically, in one exemplary embodiment of the invention, e-business applications are supported by electronic catalogs of spare parts, which present spare parts content from disparate backend data sources in a uniform, integrated manner, as well as business logic programs that support transaction activities such as navigating and retrieving spare parts information and initiating spare parts sales, from the context of the electronic catalogs.

Section II describes application development and web-publishing methods for implementing e-business systems and methods according to exemplary embodiments of the invention. In particular, this section describes automated methods for generating and publishing electronic spare parts catalogs that support e-business applications for managing and selling spare parts for complex equipment. As explained below, in one exemplary embodiment of the invention, publishable spare parts catalogs are generated using XML catalog templates to extract and integrate various types of spare parts information from different backend legacy systems and data sources. The spare parts catalogs can be rendered into a suitable presentation modality (e.g., HTML) to provide a navigable user interface for on-line browsing and retrieving of spare parts information and for initiating sales transactions.

Section III describes various business logic functions according to exemplary embodiments of the invention, to support e-business applications for managing and selling spare parts for complex machines. In particular, this section describes various on-line functions that support on-line access and retrieval of spare parts information in connection with published spare parts catalog content. For example, as explained below, such on-line functions include navigating and searching spare parts information, and initiating parts orders from the context of the catalog content.

It is to be understood that the systems and methods described herein may be implemented in various forms of hardware, software, firmware, special purpose processors, or a combination thereof. The methods described herein may be implemented in software as an application (e.g., web application) comprising program instructions that are tangibly embodied on one or more program storage devices (e.g., magnetic floppy disk, RAM, CD Rom, DVD, ROM and flash memory), and executable by any device or machine comprising suitable architecture. It is to be further understood that because the constituent system modules and method steps depicted in the accompanying can be implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Section I—Overview of Automated Business Systems

FIG. 1 is a high-level block diagram that illustrates a system for supporting electronic business transactions for managing and selling spare parts for complex equipment and machines, such as gas turbines, according to an exemplary embodiment of the invention. In general, FIG. 1 depicts a client/server system (100) comprising an on-line business system (101) that can be accessed using a client device (102) over one or more networks (103) (e.g., LAN, WAN, WAP, Intranet, Extranet and/or Internet, etc.). The client device (102) can be a workstation, portable laptop, PDA, etc., that includes a client XML/HTML browser application (102a).

The business system (101) comprises an application server (104) (or a plurality of application servers) which interacts with end users and controls execution of various functions supported by a business administration system (105), a navigation support system (106), and a content generation system (107). As explained further below, each system (105~107) comprises various functional modules that provide support on-line browsing and retrieval of spare parts information for complex equipment and machines, as well as support for spare parts ordering/sales transactions.

The business system (101) further comprises various backend enterprise applications and data repository sources from which various types of spare parts content is extracted/obtained to generate electronic spare parts catalogs and support various on-line business activities and functions. For example, the business system (101) includes an engineering database (108) (or repository), an application database (115) and backend business information systems including an engineering ERP (enterprise resource planning) system (109) and a sales ERP system (112). The engineering ERP system (109) comprises an engineering ERP database (110) and supporting engineering ERP processes (111), which provide automated support for business processes associated with engineering. Similarly, the sales ERP system (112) comprises a sales ERP database (113) and supporting sales ERP processes (114), which provide automated support for business processes associated with sales and marketing. Although not specifically shown, the system (101) can be supported using other sources of spare part content including enterprise applications such as CRM, PDM and DMS, and other relational databases and file system repositories, for example.

In general, the content generation system (107) comprises functional modules for generating spare parts content on-demand, based on the publishing needs of the business system (101). More specifically, the content generation system (107) comprises functional modules for generating and publishing electronic spare parts catalogs which integrate various types of spare parts information from disparate data sources such as the engineering database (108) and backend ERP systems (109) and (112), as well as other data sources as noted above, including other web applications.

The electronic spare parts catalogs are published to the application database (115). The published electronic spare parts catalogs provide support for various on-line functions including spare part navigation, search and retrieval functionality. In addition, the content generation system (107) comprises functional modules for extracting spare parts content (such as static engineering data, real-time sales information, and other types of information) from the backend systems and data sources to provide support for on-line access to real-time spare parts pricing and availability information as well as supporting sales transactions.

As noted above, the backend ERP systems (109) and (112) and engineering database (108) provide the required static and/or real-time spare parts information to support the various business processes. In general, the engineering database (108) contains spare parts and machine related data that is obtained from, or linked to, data from one or more sources including the backend ERP databases (110, 113). The engineering database (108) maintains correspondence to the backend systems where the master data is kept up-to-date. The engineering database (108) is populated with various types of data by the backend ERP systems (112) and (109) (and other enterprise applications or data sources) using known methods. For instance, in one exemplary embodiment of the invention, the engineering database (108) is an Oracle database, for example, in which Bill Of Material (BOM) information is maintained for machine units (e.g., turbines) in a structured tabular data format. Typically, BOM information comprises a list of all constituent components of a product or assembly, wherein the list has a formal structure and states the name, quantity, and unit of measure for each component. The engineering database (108) may further comprise material codes, which are used to identify components/parts and support sales and marketing business processes. As explained below, the material codes are used to support on-line functions for creating orders and quotes for spare parts. The engineering database (108) may further include CAD drawings and other spare parts content or links to data sources comprising such content.

In general, the business administration process (105) comprises various functional modules for supporting application management and user registration and establishing user accounts and profiles, etc. More specifically, the business administration process (105) implements methods for a system administrator to create user profiles and specify user access privileges, which are maintained in a users table stored in the application database (115). As explained below, the information in the users table provides support for personalizing and customizing the spare parts content that is delivered to different users, as well as controlling access to different on-line functions by different users, based on the user information and access privileges.

The navigation support system (106) comprises functional modules to support on-line navigation, access and retrieval of spare parts information as well as requesting quotes and initiating sales transactions. For instance, the navigation support system (106) implements methods for rendering the electronic catalog documents to present an interactive user interface that enables a user to browse the catalog content and obtain relevant spare parts information in a fast and efficient manner. In particular, the navigation support system (106) includes methods to generate search queries for accessing spare parts information. Further, the navigation support system (106) comprises functional modules for setting filtering conditions that provide user assistance by automatically identifying and presenting spare parts packages that are needed for particular maintenance procedures, inspections or servicing different outage scenarios.

It is to be appreciated that the business system (101) implements an extensible application framework based on an "n-tier architecture" which separates the data, business logic and presentation layers. For instance, in one exemplary embodiment of the invention, the system (100) of FIG. 1 is an n-tier web application comprising a browser-based front end (102, 102a), a middle-tier business logic layer (e.g., 104, 105, 106, 107, 115) and backend legacy database and transaction servers (108, 109, 112).

In one exemplary embodiment of the invention, the application logic is authored using XML, although other extensible, modality-independent languages may be used) and/or other neutral declarative languages. For example, the content generation system (107) implements an XML template-based framework, whereby XML templates are applied to backend data sources to retrieve relevant spare parts information, and output such information in XML files that follow a certain DTD. The XML templates specify static and dynamic parameters that are used to query the source databases. As explained below, these templates include catalog templates that are used to extract information used for constructing electronic spare parts catalogs as well as templates for searching for spare parts content.

The electronic catalogs may be represented by a set of XML documents that integrate all the catalog content data from disparate data sources into a unified and coherent structure. In this fashion, the application logic is programmed to seamlessly source spare parts data from multiple enterprise applications and relational database and XML repositories. With such framework, when changes are made to the content and/or structure of the underlying spare parts data layer, the business logic for interacting with the electronic catalogs will not be affected, but only the application templates that extract the spare parts information are rewritten to meet the publishing need for the business application.

Furthermore, presentation of the application content may be specified based on transformation definitions stored in the application database (115) (e.g., XSLT (Extensible Style sheet Language Definitions)) that enable transformation of the structure of XML document instances to other structures (e.g., HTML). The application database (115) may comprise a plurality of style sheet files that include coding for performing such transformations and/or coding (XSL) for rendering/presenting the transformed content. The XML template/documents can specify links to such style sheet files and associated DTDs stored in the application database (115).

II. Application Development/Publishing

As noted above, the content generation system (107) comprises functional modules for developing and publishing application content to support e-business applications for managing and selling spare parts for complex equipment. In particular, the content generation system (107) comprises automated methods for generating and publishing electronic spare parts catalogs, which integrate spare parts content from disparate backend data sources into a common format and allow interaction between spare parts content from disparate sources. As explained below, in one exemplary embodiment of the invention, publishable spare parts catalogs are generated using XML catalog templates to extract and integrate various types of spare parts information from different backend legacy systems and data sources, and generating XML documents to construct publishable electronic spare parts cart catalogs. The XML catalog templates can be designed and readily modified over time to meet the spare parts specification and publishing needs for the given business system. Application development and publishing systems and methods according to exemplary embodiments of the invention will now be described in further detail hereafter with reference to FIGS. 2A~2E.

Figure 2A:
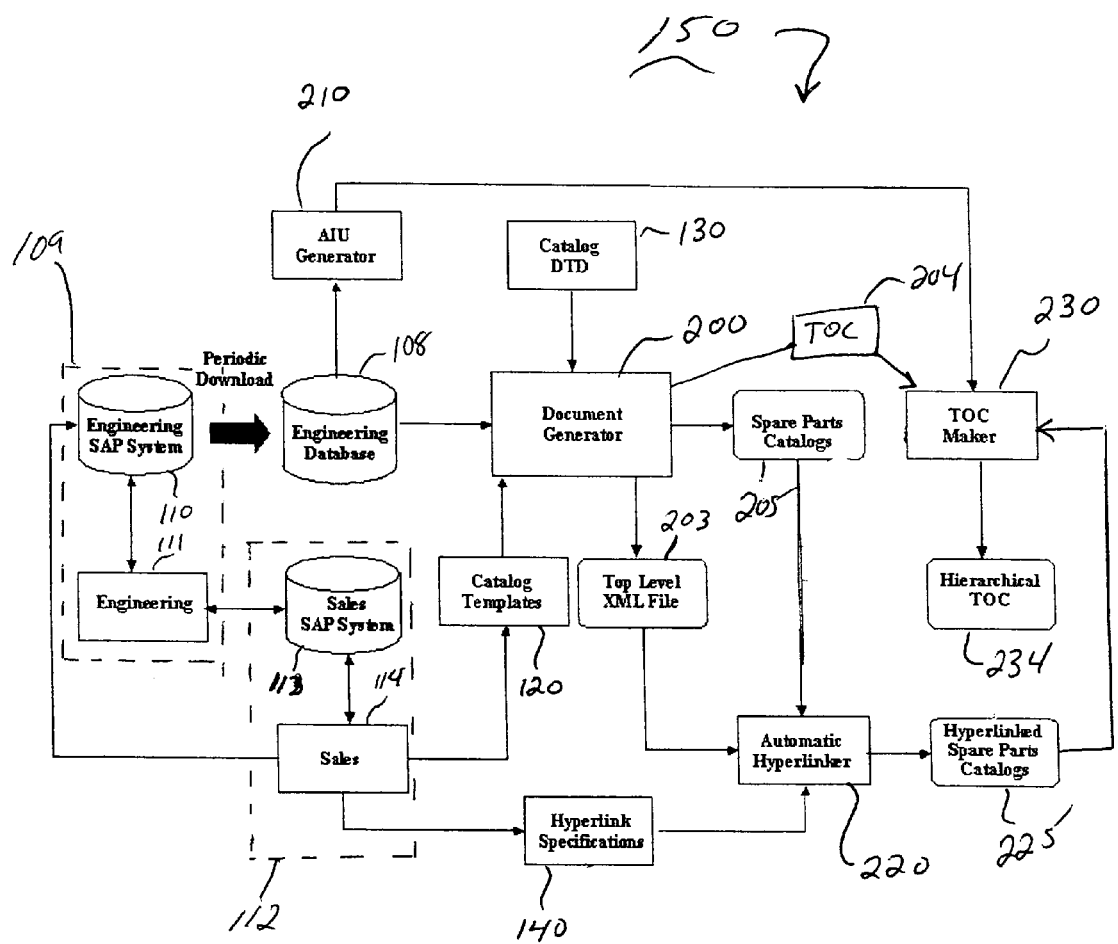
FIG. 2A illustrates systems and methods for developing and publishing an electronic catalog of spare parts according to exemplary embodiments of the invention.

FIG. 2A is a high-level block diagram illustrating systems and methods for application development and publishing according to exemplary embodiments of the invention. In particular, FIG. 2A provides a general overview of systems and methods for generating XML documents and constructing publishable spare parts catalog content. Referring to FIG. 2A, an application development and publishing system (150) generally comprises a document generator (200), an AIU generator (210), an automatic hyper linker (220) and a TOC generator (230). These modules collectively operate to generate electronic spare parts catalogs using spare parts data extracted from the various backend ERP systems (109, 112) and data repositories (108), for example. In one exemplary embodiment of the invention, the modules (200), (210), (220) and (230) are functional modules implemented by the content generation system (107) of FIG. 1.

In general, the document generator (200) is an application with a GUI that allows a user to create spare parts catalogs and other related information for machine units and publish such documents and information to the application database (115). The GUI allows a user to specify source (and destination) database connections, select different machine units, different languages, and perform other customizations. The document generator (200) generates various types of XML documents that are used for creating a user interactive and navigable electronic spare parts catalog. The document generator (200) generates XML documents that integrate spare parts content derived from one or more backend business information systems, data repositories, and/or file systems, etc., according to parameters specified by a catalog template (120) (XML template), and which content is structured as specified by a corresponding catalog DTD (130).

In one exemplary embodiment of the invention, the document generator (200) generates a set of XML documents for each machine unit (e.g., turbine), including a top level file (203), a table of contents (TOC) (204) and spare parts catalogs (205). More specifically, for a given machine unit, the spare parts catalogs (205) include a set of XML files, wherein each XML file describes a given component of the machine unit. The XML file for a given component contains information regarding the spare part subcomponents (spare part list) for the associated component. For example, the spare part subcomponent information that is contained in an XML file for a given component includes, but is not limited to, an identity string, designation, characteristics, ERP material number, order number, quantity installed, unit, net weight (per piece), and other characteristics. Furthermore, for a given machine unit, the TOC (204) comprises an index of the collection of the spare parts catalogs (205) for the machine unit. In one exemplary embodiment, the spare parts catalogs (205) are grouped by survey drawings via the TOC maker (230). The top level file (203) for a given machine unit comprises an index of all files associated with the machine unit, which files may contain textual diagram and figures and other types of relevant information obtained from other data sources. Further details regarding an exemplary document generation process will be described below with reference to the exemplary diagram of FIG. 2B.

The AIU generator module (210) implements methods for extracting information from CAD drawings or images of machine units and corresponding components to provide graphic catalog content. CAD drawings can be stored as part of the material master data in the engineering database (108). The AUI generator module (210) implements graphics/imaging methods for processing images or CAD drawings of overview (survey drawing) or other images to generate graphic images of machine units and corresponding components, which are suitable for web delivery.

Moreover, the AIU generator module (210) generates AIU files that include meta information for graphic objects including coordinates of the object and some textual description of the object. As will be explained below, the AIU files are used to support hyperlinks between spare parts lists of components and graphic illustrations of the components. In one exemplary embodiment of the invention, the AIU generator module (210) implements methods that will be discussed below with reference to FIG. 2C.

The automatic hyper linker module (220) generates hyperlinks between spare part component tables and corresponding diagrams to support catalog functionality that allows interaction between catalog content from different sources. More specifically, the automatic hyper linker module (220) creates hyperlinks between spare parts catalogs (205) and the AIU files for a given machine unit via hyperlink specifications (140). The specifications (140) describe the patterns of the "source" and "destination" points of connections for "hotspots" and links. The automatic hyper linker module (220) outputs hyperlinked spare parts catalogs (225). In one exemplary embodiment of the invention, the hyper linker module (220) implements the methods that will be discussed below with reference to FIG. 2D.

The TOC maker module (230) generates a structurally organized hierarchical TOC XML file for the spare parts components of a given machine unit. The TOC maker module (230) receives the TOC file (204) generated by the document generator (200), the survey drawing AIU files generated by the AIU generator (210) and the hyperlinked spare parts catalogs (225) generated by the hyper linker module (220), and organizes the TOC (204) in a hierarchical fashion, which mirrors the relation among the spare parts. In addition, the TOC maker (230) generates SQL commands in a file that describes the relationships between components and the spare part drawings. The SQL commands file is used to update a spare-parts table that is maintained in the online application database (115). In one exemplary embodiment of the invention, the TOC maker module (230) implements the methods that will be discussed below with reference to FIG. 2E.

Figure 2B:
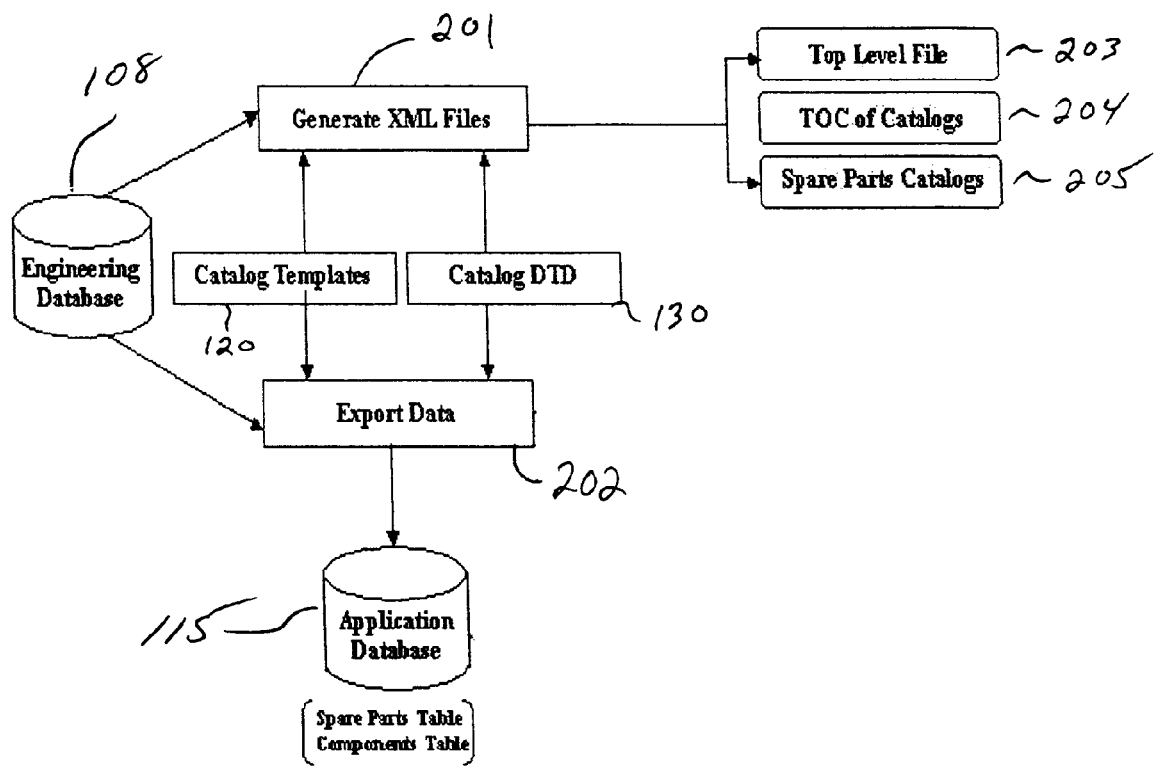
FIG. 2B illustrates systems and methods for generating documents to support electronic spare parts catalogs according to exemplary embodiments of the invention.

FIG. 2B is a block diagram illustrating a method for generating documents according to an exemplary embodiment of the invention. In one exemplary embodiment of the invention, FIG. 2B depicts functional modules of the document generator (200) in FIG. 2A, according to an exemplary embodiment of the invention. The document generator module (200) comprises an XML file generator module (201) and a data export module (202). As depicted in FIG. 2B, the XML file generation module (201) and the data export module (202) connect to the engineering database (108), load suitable catalog template(s) (120) and generate valid XML files following the defined catalog DTD (130).

The XML file generator (201) generates various XML documents for a given machine unit including XML documents 203, 204 and 205, as previously discussed. The data export module (202) publishes spare parts lists from the engineering database (108) to the application database (115). The spare part lists comprise spare part catalogs for each component of a given machine unit, which are stored in a spare parts table in the application database (115). The spare parts table for a given machine unit includes all information related to the spare parts catalogs for the machine unit. In addition, for each machine unit, a components table is generated and stored in the application database (115). The components table is generated using the hierarchical TOC file for the machine unit. The published data in the application database (115) is used to support various on-line navigational features (as will be explained below).

In one exemplary embodiment, a data model is implemented, wherein the document generation module (200) queries tables/views in the engineering database (108) and maps them to the XML files according to the catalog template (120) and settings defined by a user via a GUI. To be noted is the importance of the application templates, which define how the element values in the generated XML files are populated by extracting which fields from the database (108). Customization can be achieved by simply changing the entries in the catalog template file (120). The catalog template (120) (or specification file) is an XML template which specifies static and dynamic parameters that are used to query a source database. An exemplary structure for a catalog template is as follows:

```
<DocSpecList >
    <Globalvars>        ... global variables and setting
    </Globalvars>
    <Database> ... for database operation
    </Database>
    <DocSpec SpecName="GroupParts" MenuName="Spare Parts
    List">... for Spare
Parts documents
    ...
        <PartsList>        ...
        ...
    </DocSpec>
    <DocSpec SpecName="PartsMapping1" MenuName="Parts Mapping
    Table1">..
    ...        for Parts Mapping Table
<PartsMapping1 Name="WB2PG">
    ...
    </DocSpec>
    <DocSpec SpecName="PartsTOC" MenuName="Table of Content">
    ...        for Parts Mapping Table
    <PartsTOC ReportStyle="Table">
    ...
    </DocSpec>
... specification for other documents such as Spare Part Drawings,
Reference Tables
</DocSpecList>
```

In the exemplary catalog template structure, global variables are first listed and then for each of the file types generated, the source, destination and the database queries used are defined.

The spare arts catalog DTD (130) defines the structure of the spare parts documents for authoring, viewing and printing. The document structure comprises a basic document structure according to a simple document DTD, which is used for general-purpose documents. The document structure further includes application-specific document structure, which structure is based on the results from the analysis of spare parts documents. The application-specific document structure is used to increase the degree of document reusability, support formatting, etc.

It is to be appreciated that spare parts and component tables that are stored in the application database (115) are relational tables, which are constructed using information from the various XML files (203, 204 and 205), to enable online navigation and searching of spare parts content. The spare parts and component tables are generated to allow the XML spare parts documents to be archived and searched in a manner that takes advantage of the structured nature of such documents where, for instance, different spare parts can be searched based on their different characteristics or based on their hierarchical position.

In one exemplary embodiment of the invention, the methods described in the commonly assigned patent application Ser. No. 10/732,030, entitled "Method of hybrid searching for extensible markup language (XML) documents", which is incorporated herein by reference, may be used for generating a database from the collection of XML files (203, 204 and 205). Moreover, these methods may be used for mapping queries to Structured Query Language (SQL) statements for extracting appropriate entries from the XML documents to support search functions as described below.

Figure 2C:
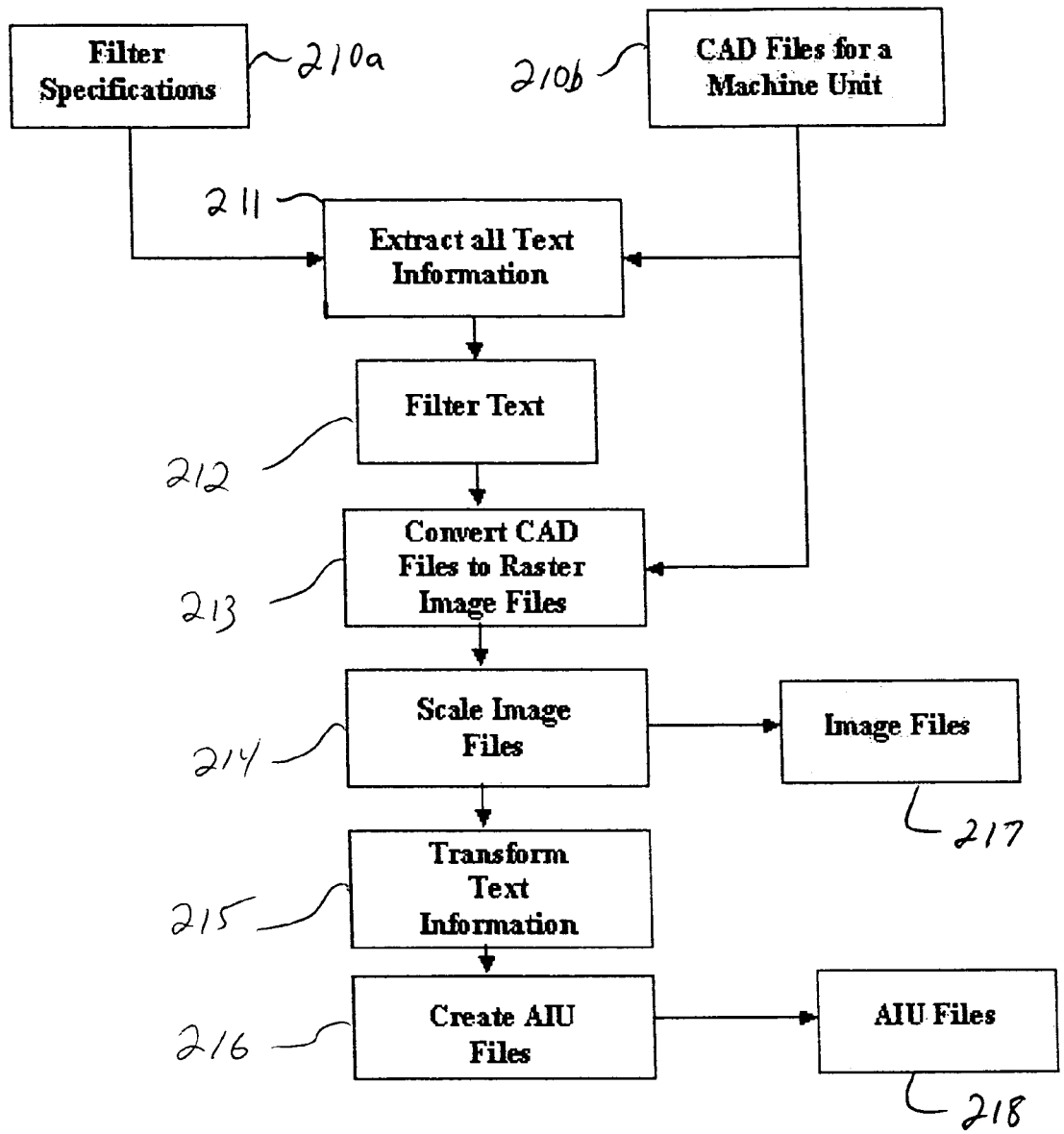
FIG. 2C illustrates a method for generating AIU (anchorable information units) for spare parts catalogs according to an exemplary embodiment of the invention.

FIG. 2C is a flow diagram illustrating a method for creating AIU files for spare part catalogs according to an exemplary embodiment of the invention. FIG. 2C illustrates a method implemented by the AIU generator module (210) according to an exemplary embodiment of the invention. The AUI generator module (210) receives as input filter specifications (210*a*) and CAD files for a given machine unit (210*b*) In one exemplary embodiment of the invention, the CAD files are engineering drawings that are stored in the engineering database (108) for different machine units. The CAD files (drawings) may be vector diagrams that illustrate machine components and subcomponents. The filter specifications (210*a*) specify patterns for filtering textual data in the CAD drawings.

Next, the CAD files (210*b*) are processed to extract all text content and corresponding bounding boxes (step 211) and filter the extracted text (step 212) using the filter specifications (210*a*). Each CAD file (a vector image) is converted to a raster image (step 213) and the image files are scaled to a smaller size (step 214) to generate image files (217) that are suitable for web delivery. Moreover, for each CAD file, the text information is transformed (step 215) by applying the same transformation to the bounding boxes for the text regions. The text is then saved in AIU files with their bounding boxes (step 216) and the AUI files (218) are output.

Figure 2D:
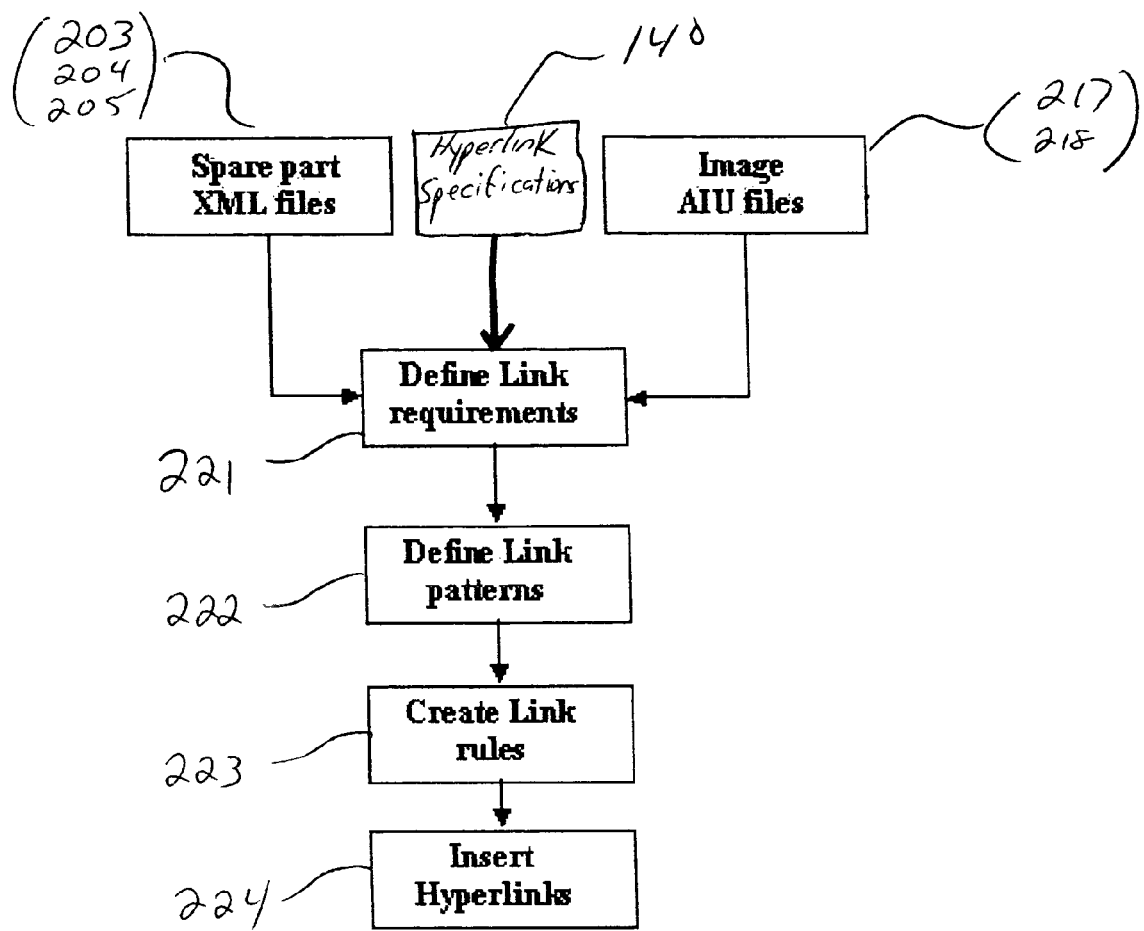
FIG. 2D illustrates a method for generating hyperlinks to support navigation between catalog content from different sources, according to an exemplary embodiment of the invention.

FIG. 2D is a flow diagram illustrating a method for hyper linking spare parts catalogs according to an exemplary embodiment of the invention. FIG. 2D illustrates a method that is implemented by the hyper linking module (220) of FIG. 2A. This process supports on-line navigation functionality by creating hyperlinks between the spare part component tables and their corresponding diagrams, between the overview drawings and the components, etc. Referring to FIG. 2D, the input data to the process includes the XML files (203, 205) for example, the link specifications (140) and the AUI files and images (217, 218). An initial step is to define the link requirements (step 221) which includes all the different types of links that are specified for the given application. For example, in one exemplary embodiment, the link types include (i) spare parts list-to-spare parts drawing, (ii) spare parts drawing-to-spare parts list, (iii) spare parts list-to-overview diagrams, and (iv) overview diagrams-to-spare parts list. As noted above, spare parts lists are XML files and the AUI files include meta information including links for images.

Next, the link patterns for the source and destinations for the links are identified (step 222) and link rules are created (step 223). The link rules define the type of links to be inserted and the location at which the link is inserted. Finally the hyper linker process is executed to insert the hyperlinks (step 224). This process parses all input XML files (e.g., Top level (203) and spare parts catalogs (205)) and the AIU files (217, 218) for the images and inserts links based on the link rules. The automatic hyper linking process may be implemented using known methods.

Figure 2E:
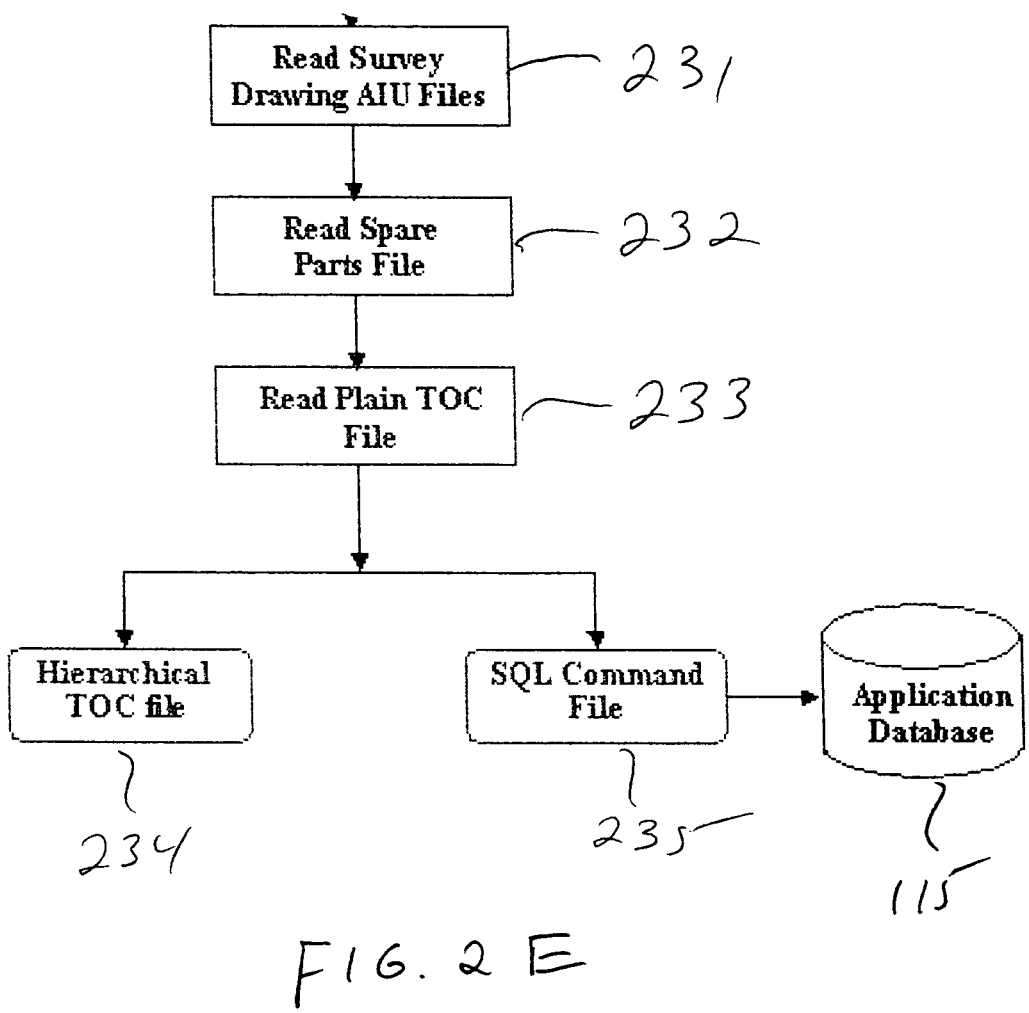
FIG. 2E illustrates a method for generating a hierarchical table of contents for spare parts components according to an exemplary embodiment of the invention.

FIG. 2E is a flow diagram that illustrates a method for generating a hierarchical TOC file according to an exemplary embodiment of the invention. The method of FIG. 2E may be implemented by the TOC maker module (230) in FIG. 2A, according to an exemplary embodiment of the invention. As illustrated in FIG. 2E, for a given machine unit, the TOC maker (230) reads survey drawing AIU files (step 231) generated by the AIU module (210), reads the plain TOC file (204) generated by the document generator module (200), (step 232), and reads the hyperlinked spare parts XML files (225) generated by the hyper linker module (220) (step 233) and processes the data to generate a hierarchical TOC file (step 234) and an SQL commands file (step 235) The SQL commands file is used to update the spare-parts table in the application database (115). More specifically, the module will parse the survey drawing AIU files to obtain the survey drawing file name and sort the necessary information. The module will then parse all the hyperlinked spare parts files to obtain information about which component belongs to which spare part drawing and other necessary information. The module will then parse the original plain TOC file which is used as the base for the hierarchical TOC XML file. Thereafter, a structured hierarchical TOC XML file for a machine unit is generated and the SQL commands are generated in a file to update the spare-parts table in the application database (115).

III. On-Line Functions

Once the electronic spare parts catalogs are generated and published, the published electronic spare parts catalogs provide support for various on-line functions including spare part navigation, search and retrieval functionality, as well as support for other business transactions including quoting and ordering spare parts. Various methods for supporting on-line functionality will now be explained in further detail.

User Administration and Login

As noted above with reference to FIG. 1, the business administration system (105) implements methods for various administrative functions including, e.g., user registration and managing and administering user information. The user information is utilized to personalize content delivery and control user access to on-line functions. The business administration system (105) includes methods that enable an authorized person (administrator) to access and establish user accounts and categorize users with appropriate privileges. To ensure security, users are not allowed to register into the on line system (101) directly. User management is part of the administration tasks as identified in role assignments. The business administration system (105) allows an administrator to create, access and update a "user table" in the application database (115). The user table stores all information regarding the user profiles and user access privileges.

Figure 3:
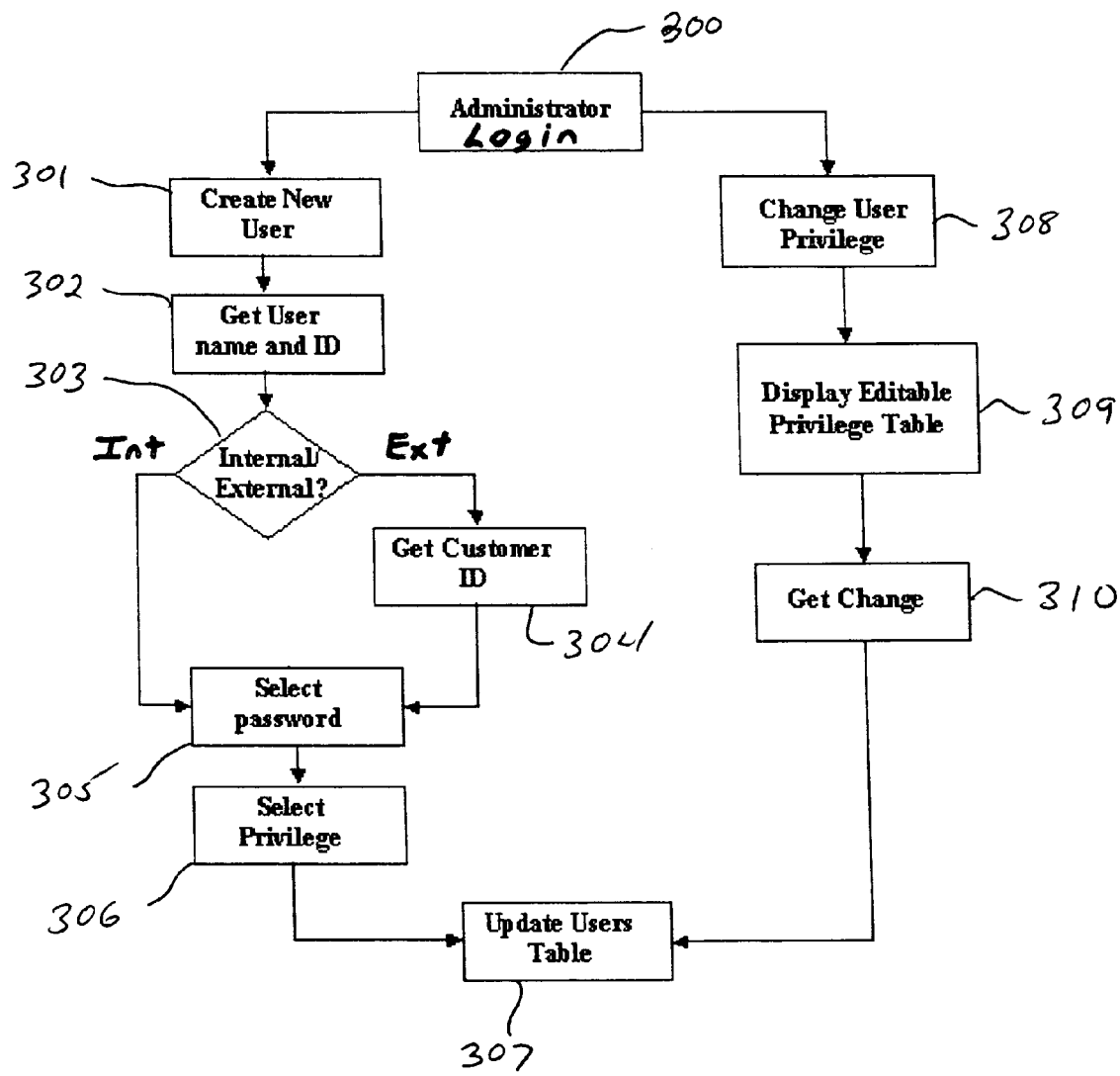
FIG. 3 illustrates user administration methods according to exemplary embodiments of the invention.

FIG. 3 is a flow diagram illustrating methods for user administration according to exemplary embodiments of the invention. Initially, an authorized user (administrator) will login to the system using an administrative account (step 300). An administrator can create a new user account or change privileges of an existing user account. When registering a new user, a new user is created (step 301) with information such as the user name and a preferred User ID (step 302). The administrator will select whether the user is an internal user or a customer (external user) (step 303). An internal user is a user that can select a customer on whose behalf they want to use the system and external users are, e.g., direct customers of business entity associated with the system. If the new user is a customer, the user will be assigned a Customer ID (step 304). The Customer ID assignment process can be viewed as a personalization step in presenting the user with his profile and responsibilities. The internal or external user will select a password (305).

Next, the user's privilege level is determined (step 306). In one exemplary embodiment, the system support multiple user privilege levels for on-line functions as follows: a Level 1 user can only navigate; a Level 2 user can navigate and obtain price and inventory level information; a Level 3 user is afforded the access privileges of Levels 1 and 2 and is further authorized to create quotes; and a Level 4 is afforded the access privileges of Levels 1-3 and is further authorized to create orders. Moreover, system administrators (Level 5) are afforded all privileges outline above (Levels 1-4) and also have access to the administrative functionalities. Thereafter, the user table is updated to add a new row with the new user information (step 307). The user's password can be saved in an encrypted format using, for example, the SHA-1 method digest algorithm.

When the administrator issues a request to change a user privilege for an existing account (step 308), the user privilege information is displayed in an editable table format (step 309). The administrators can increase or decrease the privilege level of a user by allowing or disallowing certain functionalities (step 310). This process achieves user role assignment. The results are relayed back to the application server (104) and the user table stored in the application database (115) is updated accordingly (step 307).

Once user accounts are properly established, the system (101) will utilize the users table in the application database (115) to support user logins in a way that fits the business requirements. The system (101) implements a login process wherein the user information in the users table is utilized to personalize content presented to a user based on the needs of the user.

Figure 4:
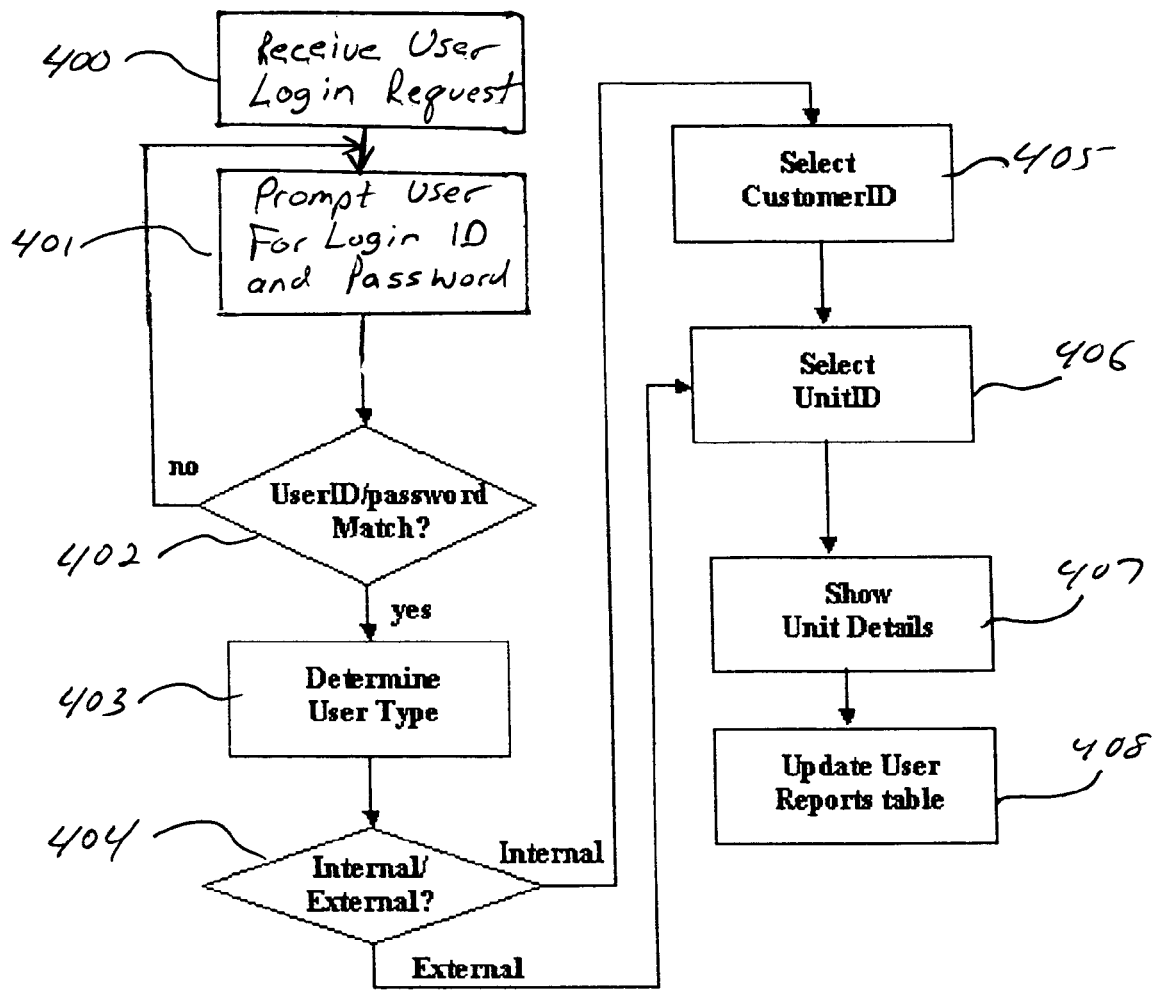
FIG. 4 illustrates a user login process according to an exemplary embodiment of the invention.

For example, FIG. 4 is a flow diagram illustrating a user login procedure according to an exemplary embodiment of the invention. When the system (101) receives a user login request (400), the user is prompted to enter a login ID and password (step 401). The system will check the validity of the submitted information by comparing the submitted information against the user information stored in the application database (115). If there is no valid match (negative result in step 402), the system will prompt the user to enter the correct information (return to step 401).

If there is a valid match (affirmative result in step 402), the system will determine the user type (e.g., internal or external) from the user table (step 403). Internal users are users who can choose the customer on whose behalf they want to use the system and external users are, e.g., direct customers of the business entity that is associated with the system. An internal user will select a customer ID (step 405) and then a unitID (step 406). An external user is directly routed to the Units owned by the user so that the user can select the unitID (step 406). The details of the selected machine unit are shown to the user (step 407). A user report table is updated to increment the number of times the user has logged in to the system (step 408).

Figure 14A:
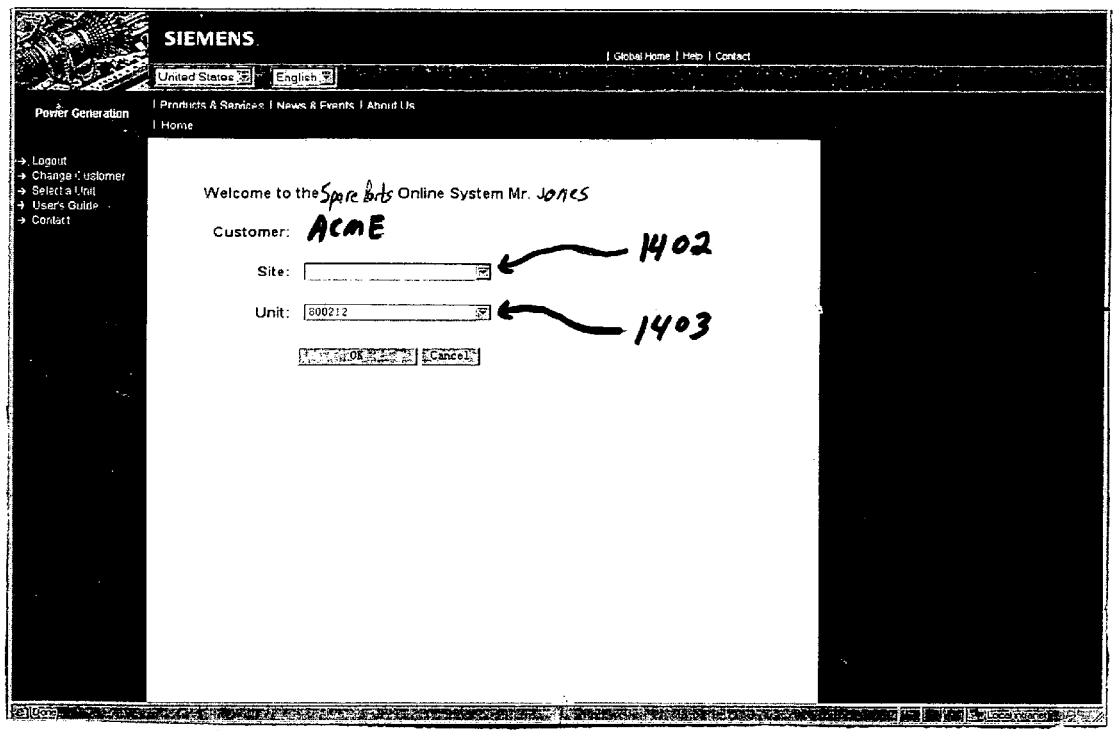
Figure 14A:
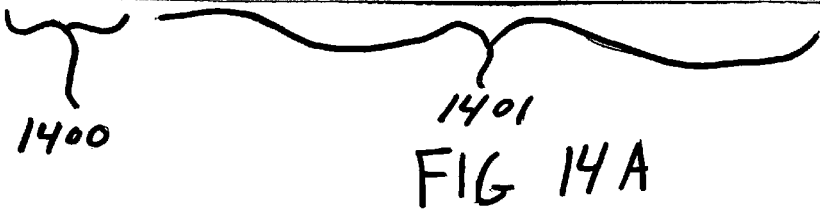

FIG. 14A illustrates an exemplary GUI screen, which provides a user interface for selecting a customer site and UnitID, according to an exemplary embodiment of the invention. As depicted in FIG. 14A, after a valid user (e.g., Mr. Jones) logs in for (or on-behalf of) a given customer (e.g., ACME), a GUI screen having a TOC (table of contents) section (1400) and main content section (1401) is presented to the user. The main section (1401) provides a pull-down menu (1402) for selecting a desired "customer site" from a plurality of sites associated with the customer, and/or a pull-down menu (1403) for selecting a UnitID (e.g., unit ID No. "800212") of a machine unit owned by the customer. The TOC section (1400) includes functions such as "change customer" and "select a unit", for example, which may be selected (e.g., via mouse click).

In one exemplary embodiment of the invention, the manner in which content/information is presented to the user during a user session will "personalized" in accordance with the user profile information, responsibilities and access privileges. For example, once a customer is fixed, various information such as customer name, Site name and machine UnitID will be displayed to the user, all of which fall into the user's category of responsibilities or ownership, depending on the user type, e.g., internal or external. In this process, the system determines the user privileges as established by the system administrator, which determines the functionalities that are available on-line to the user. In particular, the role assignments specified during creation of the user account will be used to determine the access level of pages and functionalities within the system that are available on-line to the given user. Further details of the personalization process for various on-line functions will be discussed below.

Navigation

As noted above, electronic spare parts catalogs are generated and published to support on-line functions for browsing, searching and retrieving spare parts information. The electronic spare parts catalogs integrate spare parts information from various sources of spare parts content. The navigation support system (106) implements methods for rendering the catalog documents to present an interactive user interface that integrates the different content for access by the user, and for providing support for initiating quotes and orders, etc.

Once a user is logged into the system, the system will present user interface screens as the user interacts with the system to enable the user to navigate through the spare parts catalog associated with the selected machine unit and select desired functions for retrieving spare parts information and initiating sales transactions. As a user navigates to different pages (e.g., GUI screen) and sections of the system, the content presented to the user, and the functionality afforded to the user, can continually change and be adapted (personalized) based on the user access privileges.

Figure 14B:
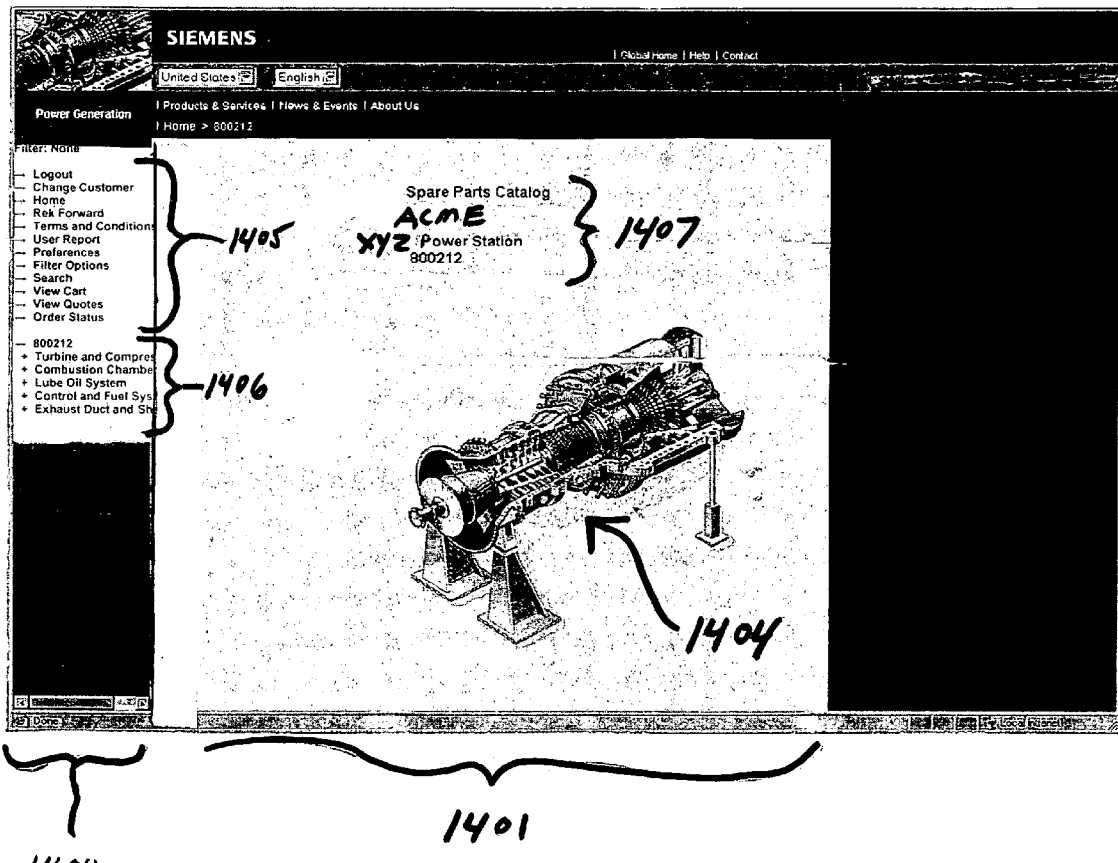

By way of example, FIG. 14B illustrates an exemplary GUI screen, which provides a user interface that is presented to a user once a machine unit is selected, to enable a user to commence navigation of the spare parts catalog for the selected machine unit. In particular, as depicted in FIG. 14B, the main content area (1401) displays an overview drawing (1404) of the selected machine unit (e.g., gas turbine), as well as information (1407) including customer name (e.g., "ACME"), the customer site (e.g., "XYZ Power Station") and the selected machine unitID (e.g., "800212").

Moreover, the displayed page in FIG. 14B displays in the TOC section (1400), (i) a "functional" section (1405) that lists all the functions that a user can perform based on the user's access level and (ii) a "machine" section (1406) that lists the components of the machine unit under consideration in a hierarchical tree. Exemplary functions that may be selected include, for example, "Filter Options", "Search", "View Carts", "View Quotes", which will be described below. In general, the "machine" section (1406) includes a hierarchical tree that depicts the relationship between components of the machine unit under consideration, which components are grouped by the survey drawings associated with the machine unit. The component tree can be expanded or collapsed based on the user's choice of components. In the exemplary GUI page of FIG. 14B, the machine section (1406) includes a high-level listing of the design groups associated with the displayed machine unit (1404) (e.g., "Turbine and Compressor", "Combustion Chamber", "Lube Oil System", etc.). By clicking on the "+" symbol in front of a displayed design group, the user can view the spare parts assemblies of the given group.

Figure 14C:
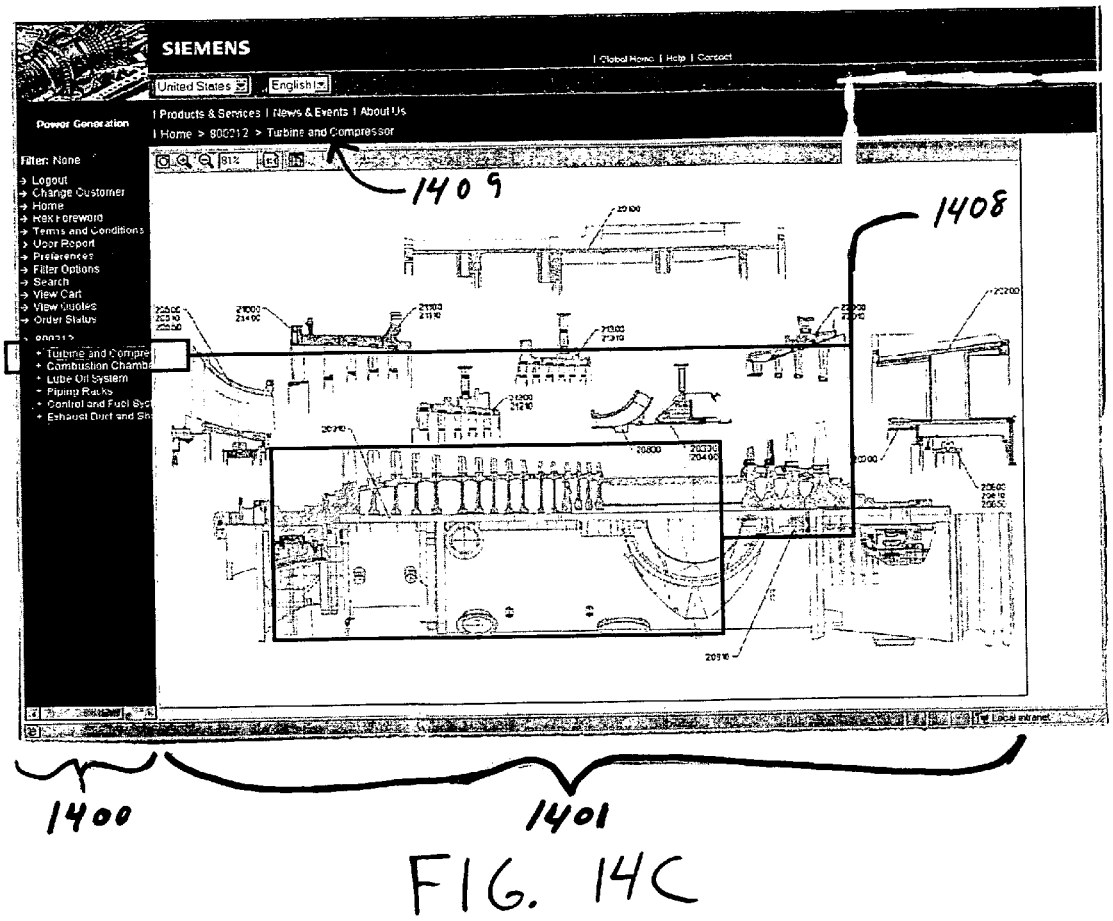

For instance, FIG. 14C illustrates a GUI screen which displays spare parts assemblies of a selected design group, according to an exemplary embodiment of the invention. In particular, FIG. 14C is an exemplary GUI screen in which the main content section (1401) displays graphical illustrations of the selected "turbine and compressor" design group (1408) as well as individual graphical illustrations of constituent spare parts components of the turbine and compressor assembly (1408). As a user navigates from screen to screen, a navigation history (1409) or "breadcrumb" is displayed, which enables the user to return to any previous level in the machine unit under consideration by clicking on the corresponding step in the navigation history (1409). In particular, as illustrated in FIG. 14C, the navigation history (1409) is displayed as " . . . 800212>Turbine and Compressor" which illustrates the previous and current user selections for the exemplary pages depicted in FIGS. 14B and 14C. In FIG. 14C, the user can navigate to any individual spare part of the turbine and compressor assembly (1408) by clicking/selecting a given component currently listed in the machine section (1406) of the TOC section (1400) of the displayed page, and the spare part assembly will be displayed together with a listing of the relevant spare parts.

Figure 14D:
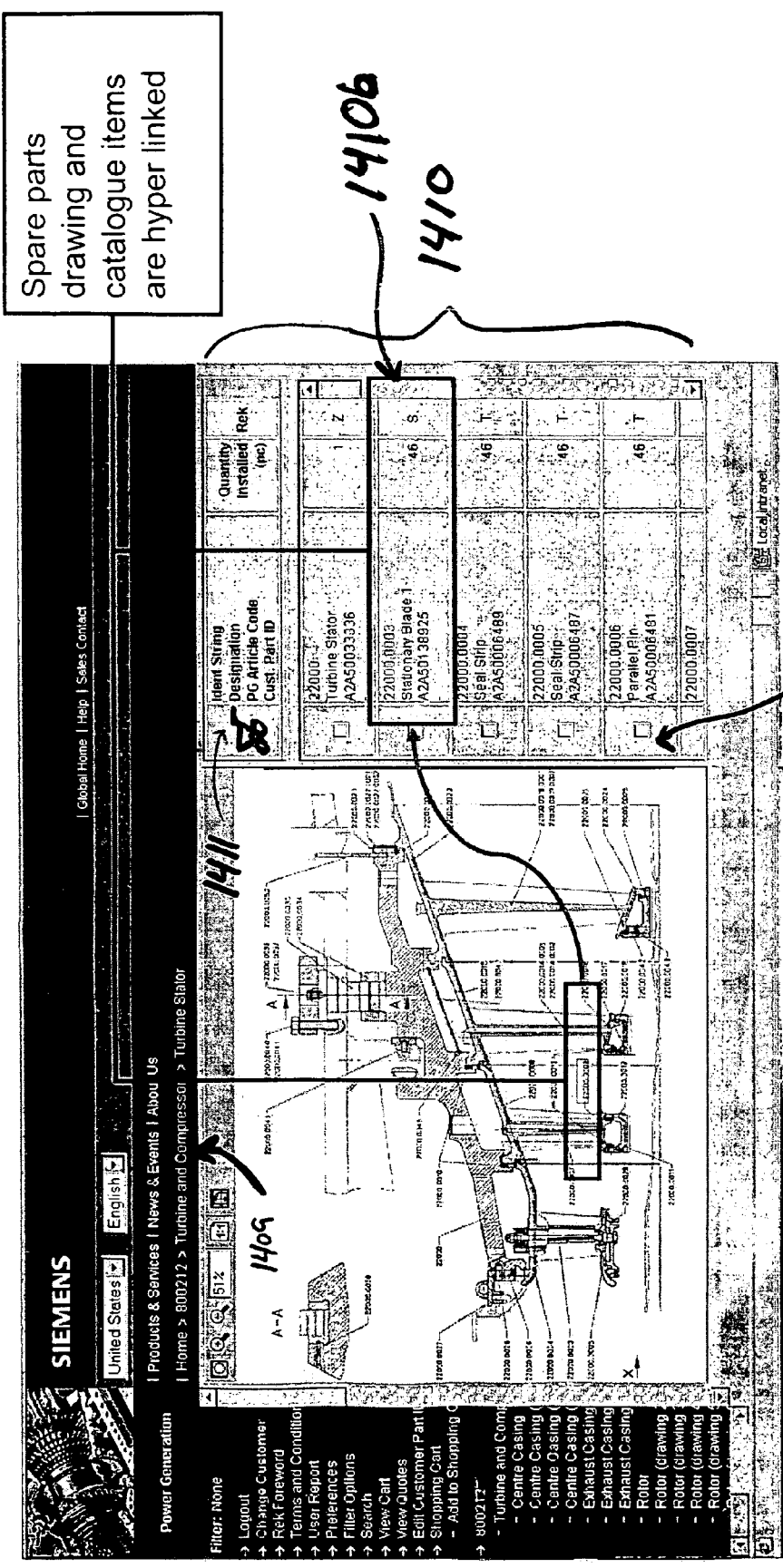

For instance, FIG. 14D illustrates a GUI screen which displays a graphical illustration of a selected spare part and a listing of spare parts associated with the selected spare part, according to an exemplary embodiment of the invention. In particular, FIG. 14D is an exemplary GUI screen in which the main content section (1401) displays a graphical illustration of a constituent "turbine stator" subcomponent of the main "turbine and compressor" component in the main content section (1401) together with a spare parts list (1410) associated with the selected subcomponent. By moving a cursor over the spare parts drawing on the main content section (1401), the displayed spare parts number will be highlighted as well as the corresponding spare part in the displayed spare parts list (1410). For example, as depicted in the exemplary embodiment of FIG. 14D, when a cursor is aligned to the illustrated spare part ("stationary blade, 22000.0003") in the main content section (1401), the corresponding spare part listing (1410b) in the displayed spare parts list (1410) is also highlighted. Moreover, a selection box (1410a) is provided for each component, which enables the user to select the component for inclusion in a "Shopping Cart" upon selection of a Cart icon (1411). As explained below, this enables a user to check availability and pricing for the selected items and obtain quotes and/or place spare parts purchase orders, etc. Exemplary methods for implementing the above on-line navigation functions will be described in further detail hereafter, with reference to the exemplary flow diagrams of FIGS. 5A and 5B, for example.

Figure 5A:
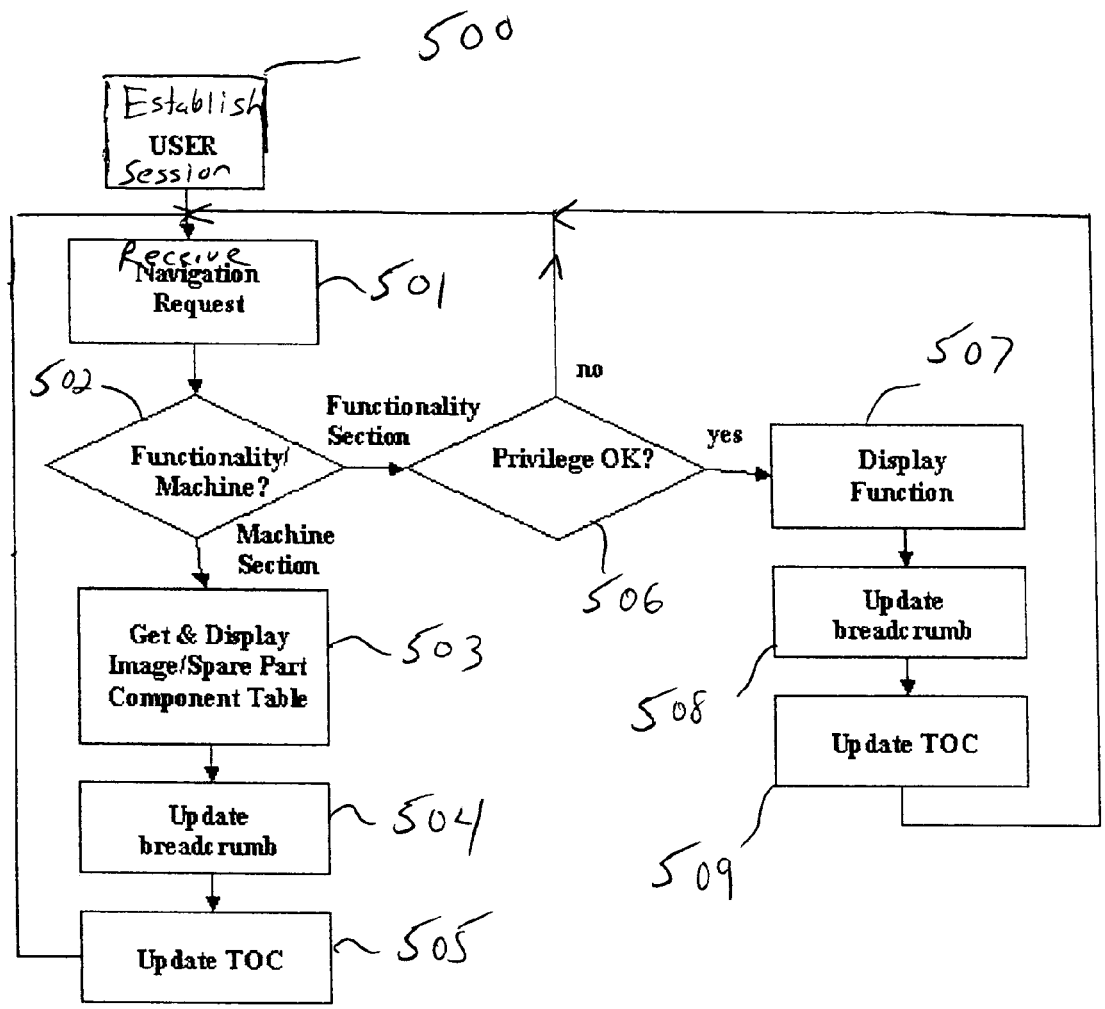
FIG. 5A illustrates methods for personalizing content delivery and navigation functionality according to exemplary embodiments of the invention.
Figure 5B:
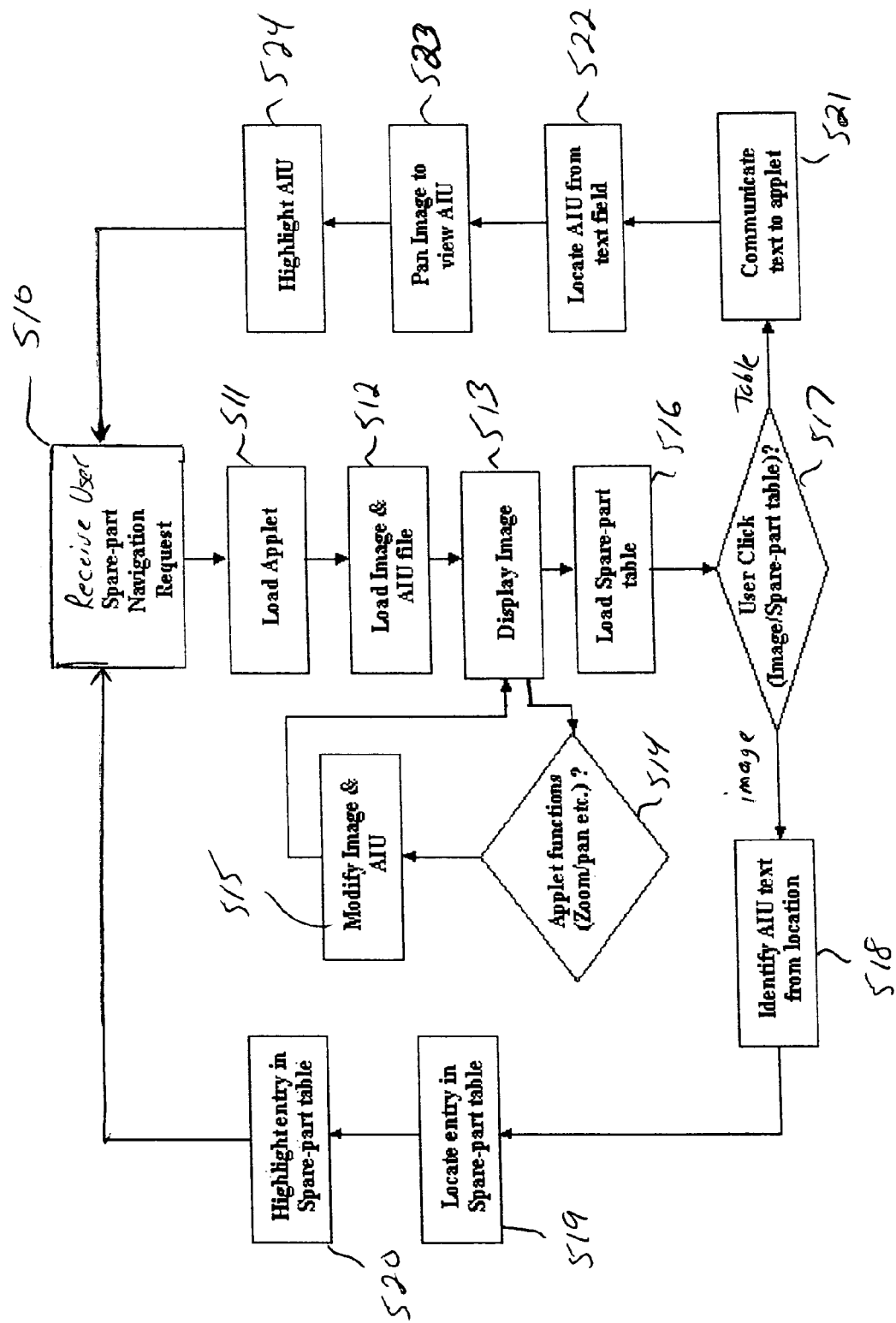
FIG. 5B illustrates navigation methods for browsing spare parts information using an electronic catalog according to exemplary embodiments of the invention.

FIGS. 5A and 5B are flow diagram illustrating methods for supporting navigation according to exemplary embodiments of the invention. More specifically, FIG. 5A illustrates exemplary methods for adapting content and functionality during user navigation based on the user privileges and FIG. 5B illustrates a method for component navigation. Referring to FIG. 5A, after a user has completed a user login process and has selected a desired unit (e.g., the process of FIG. 4), the machine and user information is stored as part of an established application session (step 500). When the user submits a navigation request (step 501) a determination is made as to whether the navigation request is with respect to a function or a machine (step 502). As explained above with reference to the exemplary GUI screens of FIGS. 14B-14D, for example, a user can navigate to a machine component by clicking/selecting a given component in the hierarchical tree that is presented in machine section (1406) the TOC section (1400) of a displayed page. Moreover, a user can navigate by clicking/selecting a given function that is presented in functional section (1405) of the TOC section (1400) of the displayed page.

When the user navigation request is for a machine component/subcomponent (e.g., the user selects a given component in the hierarchical tree), the system will obtain and display the appropriate diagram and spare parts table information in the main content section of the given page (step 503). Exemplary methods for implementing step 503 will be explained below with reference to the flow diagram of FIG. 5B. The navigation history (or "breadcrumb") is updated to display the component or sub-component location so that the user can navigate backwards (step 504). The breadcrumb indicates the user's location within the system, and the displayed web page can include a breadcrumb section that indicates a nested level of detailed information the user is currently viewing.

In another exemplary embodiment, if it is determined (in step 502) that the user navigation is a selection of a function (e.g., "Search" or "Filter Options" or "View Carts"), a determination is made as to whether the user is authorized to access the requested function (step 506). If the user is authorized (affirmative determination in step 506), a corresponding page with allowed functions will be displayed on the main content section (step 507). These options indicate the functional aspects of the page. The breadcrumb will be updated to display that functionality and also show the possible sub-functions allowed from the page (step 508). The TOC section is updated to show the possible functions that can be accessed from the page (step 509). For instance, for a "Search" function, an "Add to Cart" option can be displayed, whereas from a "View Carts" page, allowable function including viewing details of a particular Shopping Cart or deleting an existing Shopping Cart. At every point, only those functionalities that the user is authorized/privileged to access will be accessible. Details regarding various functionalities will be discussed in further detail below.

FIG. 5B is a flow diagram that illustrate a method for spare part component navigation according to an exemplary embodiment of the invention. More specifically, FIG. 5B illustrates a method for navigating between the spare-part components table and accompanying drawings. As noted above, FIG. 5B illustrates a method for implementing step 503 in FIG. 5A. When a user selects a spare part component (step 510), an applet is loaded to support various functions such as reading the corresponding image and AIU files and other functions such as zooming, panning, hyperlinked navigation etc. (step 511). The applet processes user clicks/selections of content presented on the page. The image of the selected spare-part component is loaded along with the corresponding AIU file (step 512) and the image is displayed (step 513). Moreover, the applet will load the spare parts table for the selected component (step 516). While an image is displayed, if the user changes the image resolution by selecting functions such as zooming or panning (step 514), the image will be re-rendered and the associated AIU is loaded accordingly (step 515).

As noted above, the navigation system supports hyperlinked navigation which allows the user to navigate back and forth between the spare parts table and the associated images. The user can click on certain "hotspot" regions of a displayed image or select a given "hotspot" entry in the corresponding spare parts table (step 517). In particular, as the user moves the pointer/cursor over regions of a displayed component image, the AIU for the current version of the applet will be displayed when the pointer/cursor is located at a "hotspot" region of the image which corresponds to an AIU. If the user clicks/selects an AIU of the displayed image (step 517), the corresponding text will be obtained from the AIU file (step 518). The text will be identified in the corresponding displayed spare parts table (step 519) and the corresponding text entry in the spare part table will be highlighted (step 520).

If the user clicks/selects certain text in the spare parts table (e.g., selects a given identity string field) (step 517), the selected text information is communicated to the applet (step 521). The corresponding AIU will be located (step 522). The image may be panned to bring the region of interest (associated with the AIU) in view inside the applet window (step 523) and the corresponding AIU is highlighted (step 524).

Searching

As noted above, the content generation system (107) supports content search and retrieval functions that enable a user to search for spare parts information for various purposes such as obtaining knowledge of the spare parts or ordering components, for example. The content generation system (107) implements an extensible, template-based framework that enables a user to search and access spare parts information from a source database (e.g., the engineering database (108) and/or application database (115)) along with real-time sales information (e.g., price and inventory information) obtained from the backend sales ERP system (112) (e.g., SAP).

For instance, in the system of FIG. 1, spare parts information can be extracted from the engineering database (108) backed by the engineering ERP system (109) based on an engineering template and user requests. Changes in the engineering content in the engineering database can be handled simply by changing the engineering content template, thus making the system very adaptive to database changes and the needs of the users. Moreover, real-time sales information can be extracted from the sales ERP system (112) based on the generated engineering content, a sales content template and spare parts information requests. Changes in the sales content can be handled simply by changing the sales content template, thus making the system adaptive to changes of ERP system and the needs of the users.

Figure 6A:
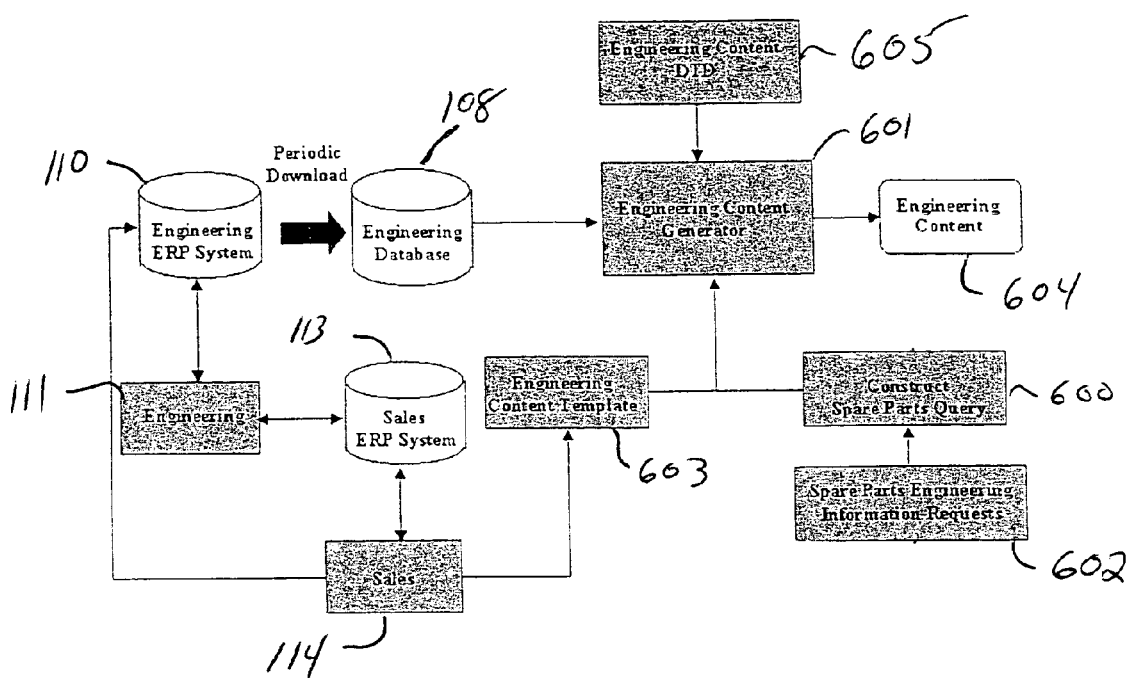
FIG. 6A illustrates a spare parts content retrieval system according to an exemplary embodiment of the invention.

FIG. 6A is a diagram illustrating a content retrieval system according to an exemplary embodiment of the invention. FIG. 6A depicts functional modules implemented by the content generation system (107) for searching and retrieving engineering content in response to user search requests. In general, the system comprises a query constructor module (600) and engineering content generator module (601). The query constructor (600) receives information requests (602) from the client (102) web browser, and constructs queries by combining the input requests (602) with an engineering content template (603). The template (603) is an XML file that specifies (i) the static and/or dynamic parameters and the source table name used to query a source database such as the engineering database (108) or application database (115), and (ii) the desired outputs. The queries are applied to tables in the engineering database (108) or application database (115) to retrieve information. The engineering content generator module (601) generates a spare parts document (604) using the query results and output parameters specified by the template. In one exemplary embodiment, the generated output (604) is an XML file that follows an engineering content DTD schema (605).

It is to be appreciated that the engineering content template (603) defines how the element values in the dynamically generated XML file are populated by extracting which fields (combined with user's query) from which table in the engineering database (108) or application database (115). Customization can be readily achieved by changing the entries in the template file. The engineering content template (603) is a logical presentation unit that merges database queries with output layout specification. Furthermore, the engineering content template merges with user requests from a web GUI, for example, to specify the parameters used to query the source database according to the user request.

In one exemplary embodiment, an engineering content template (603) is structured and described in XML as follows:

```
<DocSpec>
<DefineParam Name = "$CONTSTRAINTS$"></DefineParam>
<DefineVar Name = "$PARTS_QUERY$" Type="constant">
<![CDATA[SELECT DISTINCT * FROM TBL _ PARTSINFO WHERE $CONSTRAINTS$]]>
</DefineVar>
<Parts>
<Title>Parts Information</Title>
<Query stmt="$PARTS_QUERY$" resultset="$PARTS_rs$" dbtype="Oracle"
iterate="yes">
<Parts_entry>
<ERP>$PARTS_rs(1)$</ERP>
<MaterialNo>$PARTS_rs(2)$</MaterialNo>
<Description/$PARTS_rs(3)$</Description>
</Parts_entry>
</Query>
</Parts>
</DocSpec>
```

The exemplary template file has constructs to specify a class of XML documents. For instance, each <DocSpec> node corresponds to a new type of XML document such as <Parts> in the template. Further constructs are provided to declare and substitute variable occurrences. Constructs are includes to execute a query, iterate through the result-set and create an instance of the child nodes for every row returned by the query. The output columns of the query can be used like variables.

Figure 6B:
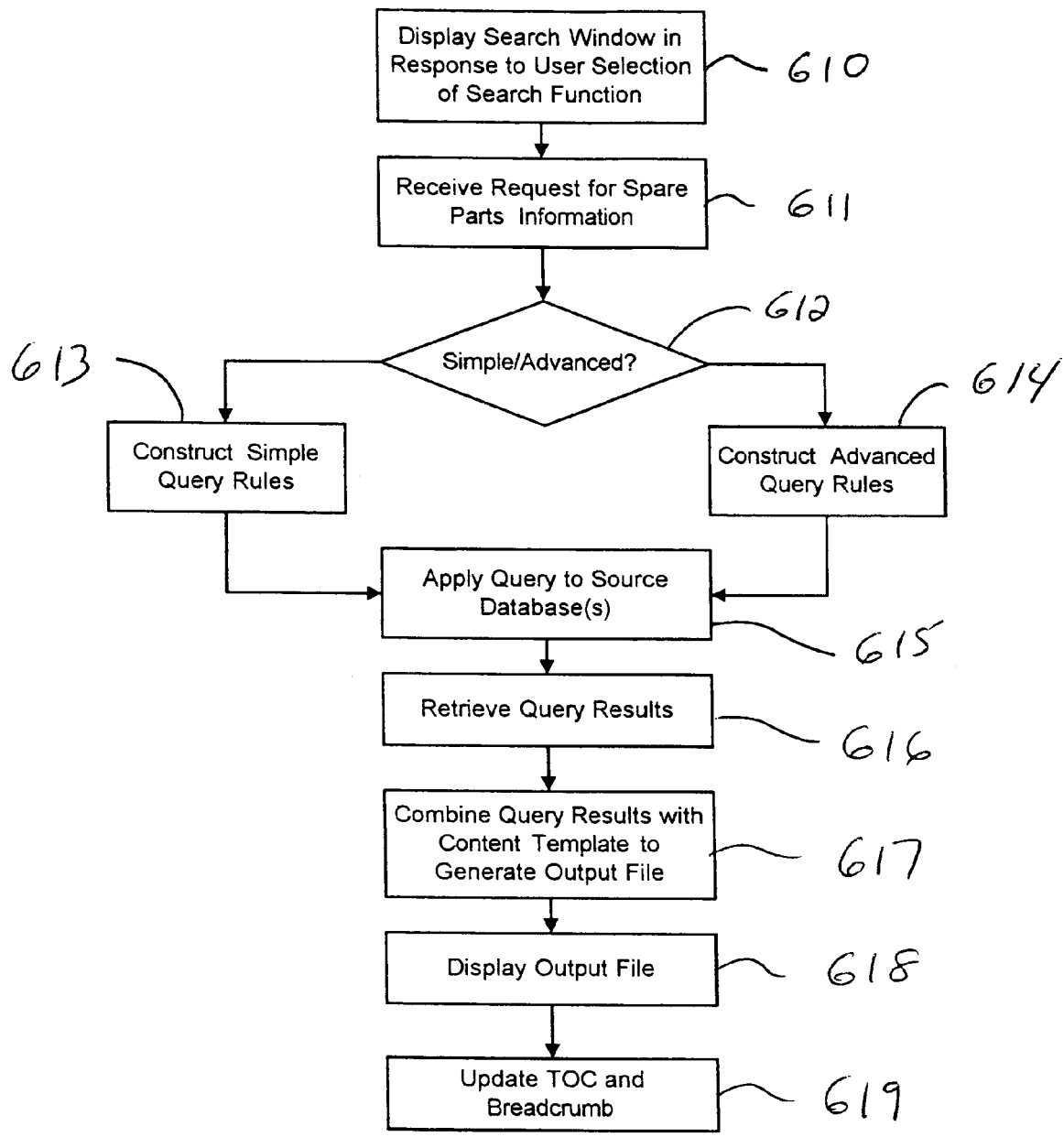
FIG. 6B illustrates a spare parts content retrieval method according to an exemplary embodiment of the invention.

FIG. 6B is a flow diagram that illustrates a spare parts content retrieval process according to an exemplary embodiment of the invention. More specifically, FIG. 6B illustrates a mode of operation of the content retrieval system of FIG. 6A. When user selects a "Search" function option from the TOC of a given page (step 610), a search window is displayed on the main content area of the page (step 611). The system will receive user search requests for spare parts information that are submitted by the user (step 611). The system will formulate a suitable query to retrieve the appropriate spare parts information. In one exemplary embodiment of the invention, several query types are supported, including a "simple query" and an "advanced query". A simple query allows a user to search for components by indicating one or more keywords. An advanced query allows a user to access spare parts information based on context specific information relevant to a component.

The system will determine the type of query selected by the user (step 612). In one exemplary embodiment, the "simple query" is set as the default query, but the user can select an "advanced query" option in which case all the relevant fields for which values can be entered are presented to the user. If the user selects a simple query and enters a value in a corresponding field and selects submit, a query string is communicated to the query constructor module to construct simple query rules (step 613). This is done by combining the query string with information provided by the engineering content template to formulate the proper queries to be applied to the engineering database. If the user is conducting an advanced query, entries in all the fields including the simple query field entered by the user are communicated to the query constructor module to construct advanced query rules (step 614) by combining the query string with information provided by the engineering content template to formulate the proper queries to be applied to the source database.

The query is applied to the spare parts tables in the source database (step 615), whereby the different fields are constrained by the corresponding entries. The source database may be the engineering database (108) or the application database (115). If a given field does not have an entry, that field is not constrained. The query result set is retrieved by the engineering content generator (step 616) and the content generator will combine the query results with the engineering content template to generate the output file (step 617). The output file is displayed to the user (step 618) and the application TOC section and breadcrumb for the displayed page are updated (step 619). The TOC and the breadcrumb sections of the user interface are updated to reflect a new functionality ("Add to Cart") that can be used with the displayed result set, as will be explained below.

Figure 14E:
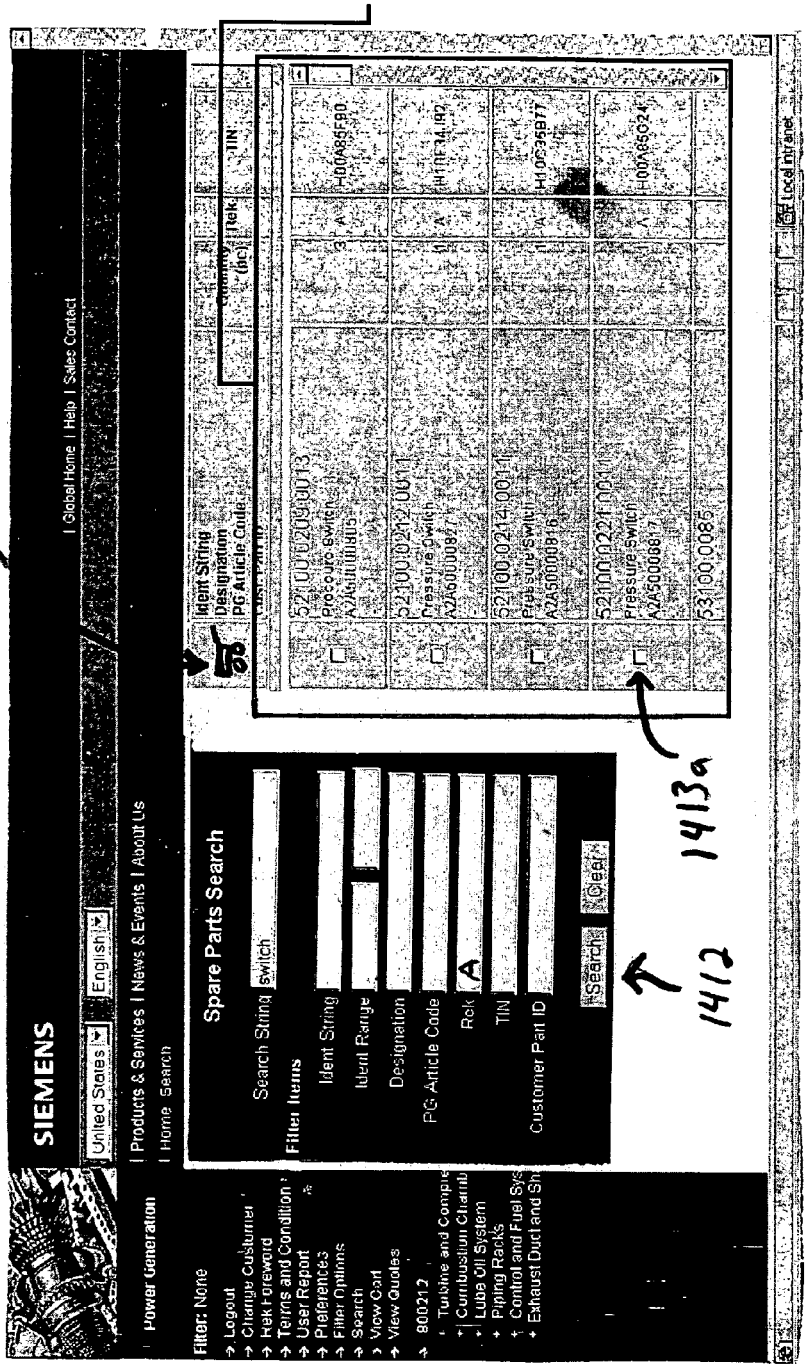

For purposes of illustration, the method of FIG. 6B will be further explained with reference to the exemplary GUI screen of FIG. 14E, which is an exemplary illustration of a search function window and displayed search results. As depicted in FIG. 14E, a user can select the "Search" function listed in the functional section (1405) of the TOC section (1400) of the displayed page, and a search window (1412) is displayed in response thereto. To perform a simple search, the displayed search window (1412) includes a "search string" field, in which a user can input a keyword (e.g., part identity string, material code, unique customer part ID, etc.) to search for all matching catalog content. To perform an advanced or "filtered" search, the displayed search window (1412) further depicts a plurality of fields to specify terms of "filter items", which provide relevant context specific fields associated with the published spare parts tables.

In the exemplary embodiment of FIG. 14E, a search is specified using a simple keyword search for spare parts components having the term "switch" under the constraint of the field "REK" having the value of "A". The search results are displayed in a separate window (1413). In particular, the exemplary search (as specified in the search window (1413)) provides a result window (1413) which lists components with the term "switch" as part of the component "Designation" and constrained by REK=A. The user can select the shopping cart icon (1411) to transfer all selected spare parts of the search results into a shopping cart for further processing (e.g., obtain quotes and availability information, initiate sales, etc.), which parts are selected using selection boxes (1413*a*).

Figure 6C:
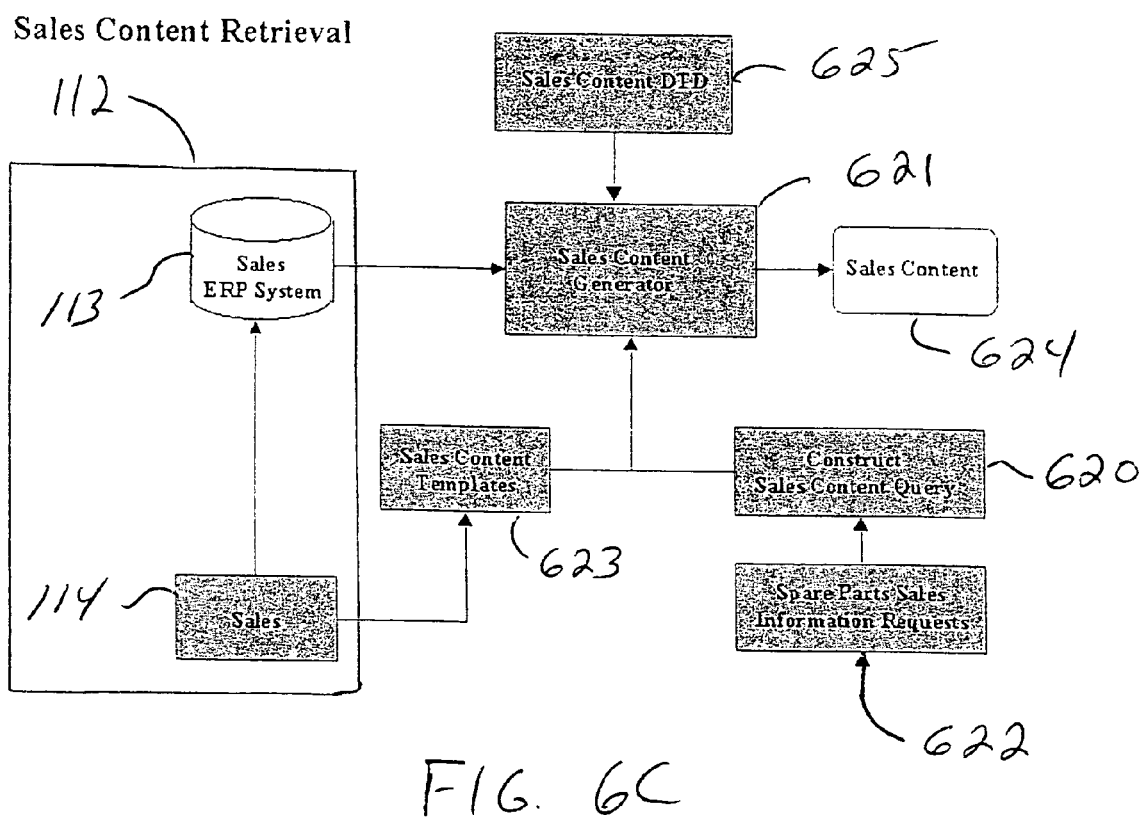
FIG. 6C illustrates a spare parts content retrieval system according to another exemplary embodiment of the invention.

In another exemplary embodiment of the invention, the engineering content that is generated (as a result of a search, for example) can be combined with a sales content template to construct queries that are applied to the sales ERP system (112) to retrieve sales content information corresponding to the engineering content. For example, FIG. 6C is a diagram illustrating a content retrieval process according to another embodiment of the invention. More specifically, FIG. 6C depicts functional modules implemented by the content generation system (107) for searching and retrieving sales content in response to user search requests. In general, the system comprises a query constructor module (620) and sales content generator module (621). The query constructor (621) receives sales information requests (622). The query constructor module (620) constructs queries by combining the input requests (622) with a sales content template (623) to specify the parameters used to query the sales ERP system (112). The query is applied to the sales ERP system (112) to retrieve sales information.

The sales content generator module (621) generates a sales content document (624) using the query results and output parameters specified by the sales content template (623). In one exemplary embodiment, the generated output (624) is an XML file that follows a sales content DTD schema (625). The sales content XML files are created by mixing the generated engineering content (which is stored in the application database) with spare parts information requests (622) and the sales content template (623). It is to be appreciated that the sales content template (623) defines how the element values in the dynamically generated XML file are populated by extracting the appropriate fields (combined with the user query) from different tables in the source database.

In one exemplary embodiment, a sales engineering content template is structured and described in XML as follows:

```
< DocSpec>
<DefineParam Name="$SALES_CONSTRAINTS$"><DefineParam>
<DefineVar Name="$PARTS_DETAILS$"Type= "content">
    <![CDATA[SELECT DISTINCT * FROM PGWBDB.tbl_MoreInfo SALES_CONSTRAINTS]]>
</DefineVar>
<PartsDetail>
<Title>Parts Information</Title>
<Query stmt="$PARTS_DETAILS $" resultset="$PARTS_rd$" dbtype="DB2" iterate="yes">
<Parts_entry>
<ERP>$Parts_rs(1)$</ERP>
<MaterialNo>$PARTS_rs(2)$</MaterialNo>
<TIN>$PARTS_rs(3)$</TIN>
<Description>$PARTS_rs(4)$<Description>
<DrawingList>$PARTS_rs(7)$</DrawingList>
<Characteristic>$PARTS_rs(5)$</Characteristic>
<Werkstof>$PARTS_rs(6)$</Werkstof>
<MatGroup>$PARTS_rs(8)$</MatGroup>
<Cost>$PARTS_rs(9)$</Cost>
<Price>$PARTS_rs(10)$</Price>
<LeadTime>$PARTS_rs(11)$</LeadTime>
</Parts_entry>
</Query>
</PartsDetail>
</DocSpec>
```

The exemplary sales content template file includes constructs to specify a class of XML document. Each <DocSpec> node corresponds to a new type of XML document such as <PartsDetails> in the template. Further constructs are included to declare and substitute variable occurrences. Moreover, constructs are provided to execute a query, iterate through the result set and create an instance of the child nodes for every row returned by the query. The output columns of the query can be used like variables.

Filtering

In other exemplary embodiments of the invention, methods are included to provide filtering functionalities that enable, e.g., customization and generating different spare parts packages that are needed for maintenance procedures, inspections or servicing different outages. As noted above, a "Filter Options" function can be selected in the TOC section of a displayed page. The filter options are defined by specific fields that describe spare part components. In one exemplary embodiment of the invention, a user can select an entire package at any time, and can also select a filter condition as a global option such that every time the user navigates to a component or searches for the component, if that spare part is part of the filter condition, it is automatically selected for further processing and inclusion in a shopping cart. This provides a unique method for interacting between filters and regular spare part navigation.

From a functional point of view, when a filter option is selected, all spare part subcomponents that are part of (defined by) the filter option are displayed. The idea is that the user can then directly use the listed spare parts to order/quote them or use the information for other purposes pertaining to the condition. In another exemplary embodiment, when one such filter condition is selected, every time the user goes to a page that has one or more of the spare part subcomponents, items belonging to this global condition are also selected. Further, when the user clicks on any of the spare-part subcomponents that are part of the result set in a filter option (or a search result set), the system leads the user to the correct component page and the appropriate subcomponent is highlighted.

Figure 7:
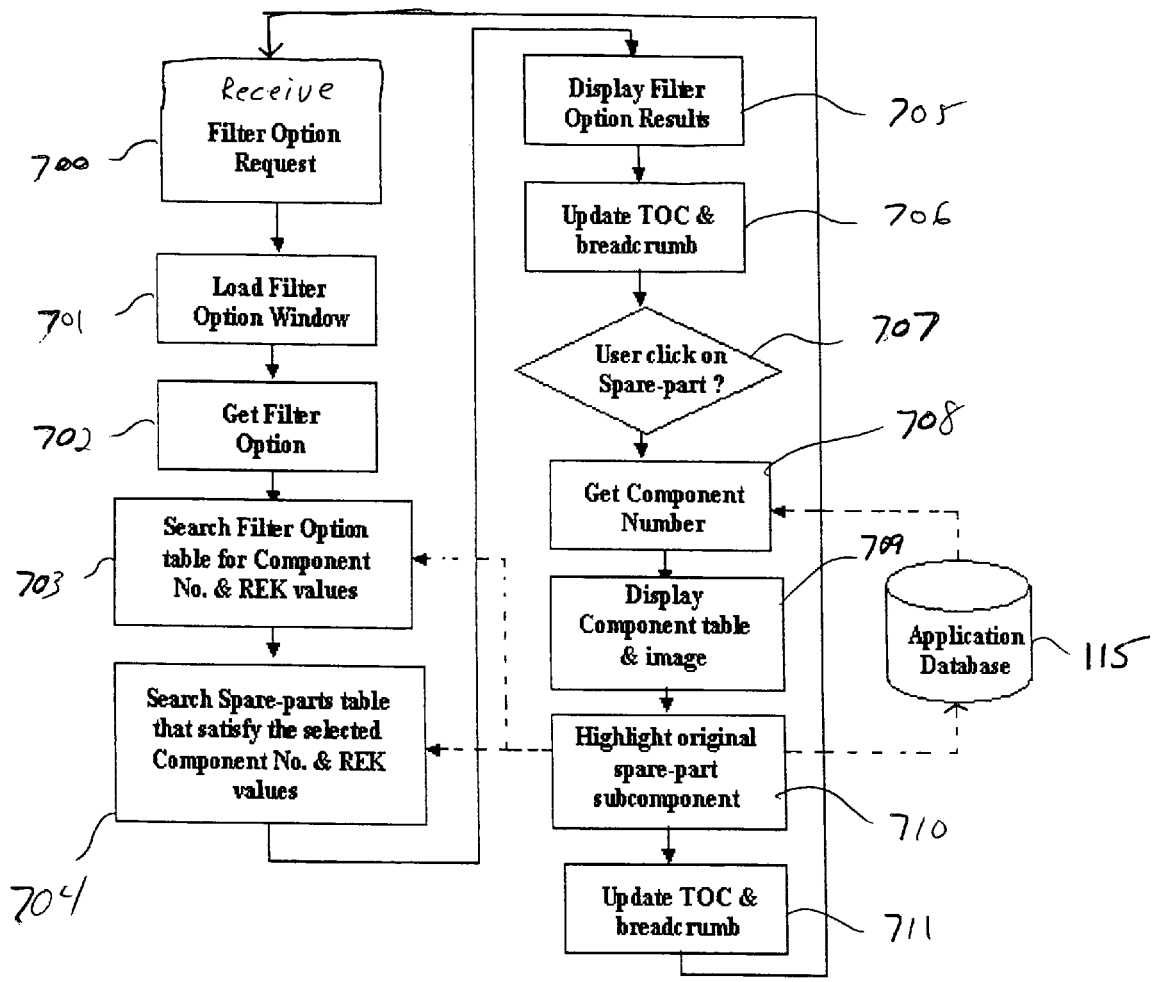
FIG. 7 illustrates methods that support filtering of spare parts information according to exemplary embodiments of the invention.

FIG. 7 is a flow diagram illustrating a filtering method according to an exemplary embodiment of the invention. When the system receives a "Filter Options" request (step 700) in response to a user selection of the filter option menu function from the TOC of a displayed page, the system will display a filter option window on the main content area of the page (step 701). The system will get a filter option (step 702) selected by the user. In one exemplary embodiment, a default option is 'None', but if the user selects any other option, such selection is communicated to the application server to search a filter option table for all components that satisfy the filter condition (step 703). Then, the spare parts table that satisfies the selected component number and REK values is searched (step 704). Thereafter, a result set is constructed and displayed (step 705). The TOC and breadcrumb are updated (step 706).

If the user clicks/selects on a particular subcomponent (affirmative determination in step 707), the information is relayed to the application server, which gets the component number (step 708) from the application database (115) (i.e., go to the spare parts table to identify the component) and then displays the component table along with the corresponding image (step 709). The original selected subcomponent (clicked on by user) is highlighted (step 710) and the TOC and breadcrumb are updated (step 711).

Creating/Updating a Shopping Cart

In other exemplary embodiments of the invention, after a user has selected one or more spare parts, the user can initiate functions to request quotes or place orders for the selected spare parts. To support such functionality, methods are provided to create and manipulate "Shopping Carts" including, e.g., methods for selecting spare parts to create a Shopping cart, deleting elements from a Shopping cart, adding new elements to a Shopping cart, and other operations. Exemplary methods of the invention allow Shopping Carts to persist between user sessions and allow authorized customers or administrators to change or modify Shopping Carts. In one exemplary embodiment, the system maintains a table (referred to as "shopping cart table"), for example, to store information associated with user quote requests, the requested date, quantity requested, and other relevant information regarding requested spare part(s).

Figure 8:
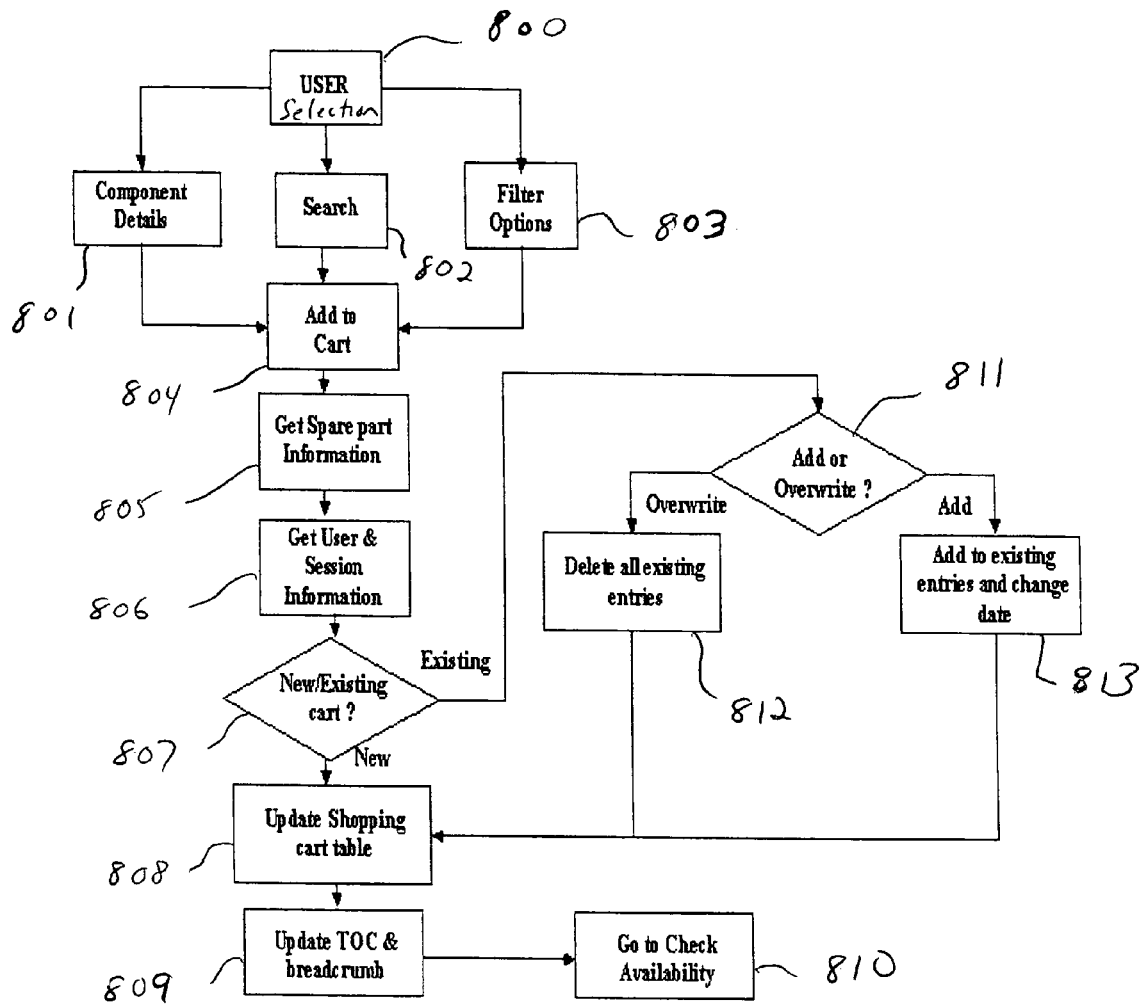
FIG. 8 illustrates methods for creating or updating Shopping Cart according to exemplary embodiments of the invention.

FIG. 8 is a flow diagram illustrating methods for creating or updating Shopping Cart according to exemplary embodiments of the invention. A user can select elements to be added to a Shopping Cart (step 800) from a component details page (step 801), a search page (step 802) or a filter options page (step 803). As noted above, these pages present options to a user to add the selected, searched or filtered items to a Shopping cart (step 804).

For each selected spare part to be added to a shopping cart, the system will determine the associated unique spare part numbers from the page where the user selection is made and then communicate such numbers back to the server whereby all related information regarding the spare parts is collected from the spare parts table (step 805). The system will then obtain all user related information such as login ID, and customer ID, along with requested or forecasted dates (step 806). The information obtained (in steps 805 and 806) is then entered in the shopping carts table.

The user can add the currently selected spare parts to a new Shopping cart or update an existing Shopping Cart with the currently selected spare parts (step 807). If the user creates a new Shopping Cart, the current selection will be added to the new Shopping cart and the shopping carts table is updated with the new Shopping Cart name for the user selection (step 808). The TOC and breadcrumb sections are updated (step 809). The user can then proceed to select a "check availability" process (step 810) (which will be described below with reference to FIG. 9).

If (in step 807) the user selects an existing Shopping Cart, the current selection can be added to an existing Shopping Car, or the current selection can overwrite the contents of an existing Shopping Cart (in effect creating a new Shopping cart with the current selections, albeit with the same name) (step 811). If the user overwrites an existing Shopping cart, all rows in the shopping cart table for the selected Shopping Cart name are deleted and new rows are updated with the current selections for the Shopping Cart name (step 812).

If the user adds the current selection to an existing Shopping Cart, the new entries are added to rows associated with the Shopping Cart and the date is updated. In particular, if there are multiple rows in the shopping cart table having the same Shopping Cart name and the same user and spare parts, the rows are consolidated by adding the quantities and updating the date field to be current session date (step 813) and the shopping cart table is updated accordingly (step 808). Thereafter, the TOC and breadcrumb sections are updated (step 809). The user can proceed to a check availability process (step 810).

Checking Availability & Price

When a new Shopping Cart has been created, or when an existing Shopping Cart has been selected for user review and/or updated, a check availability process can be performed to allow the user to check for price and availability of selected items within the Shopping Cart. With this process, the system establishes links to the relevant background ERP systems (e.g., SAP) to obtain price and inventory information on a real-time basis, which provides user assistance in deciding to place an order.

Figure 9:
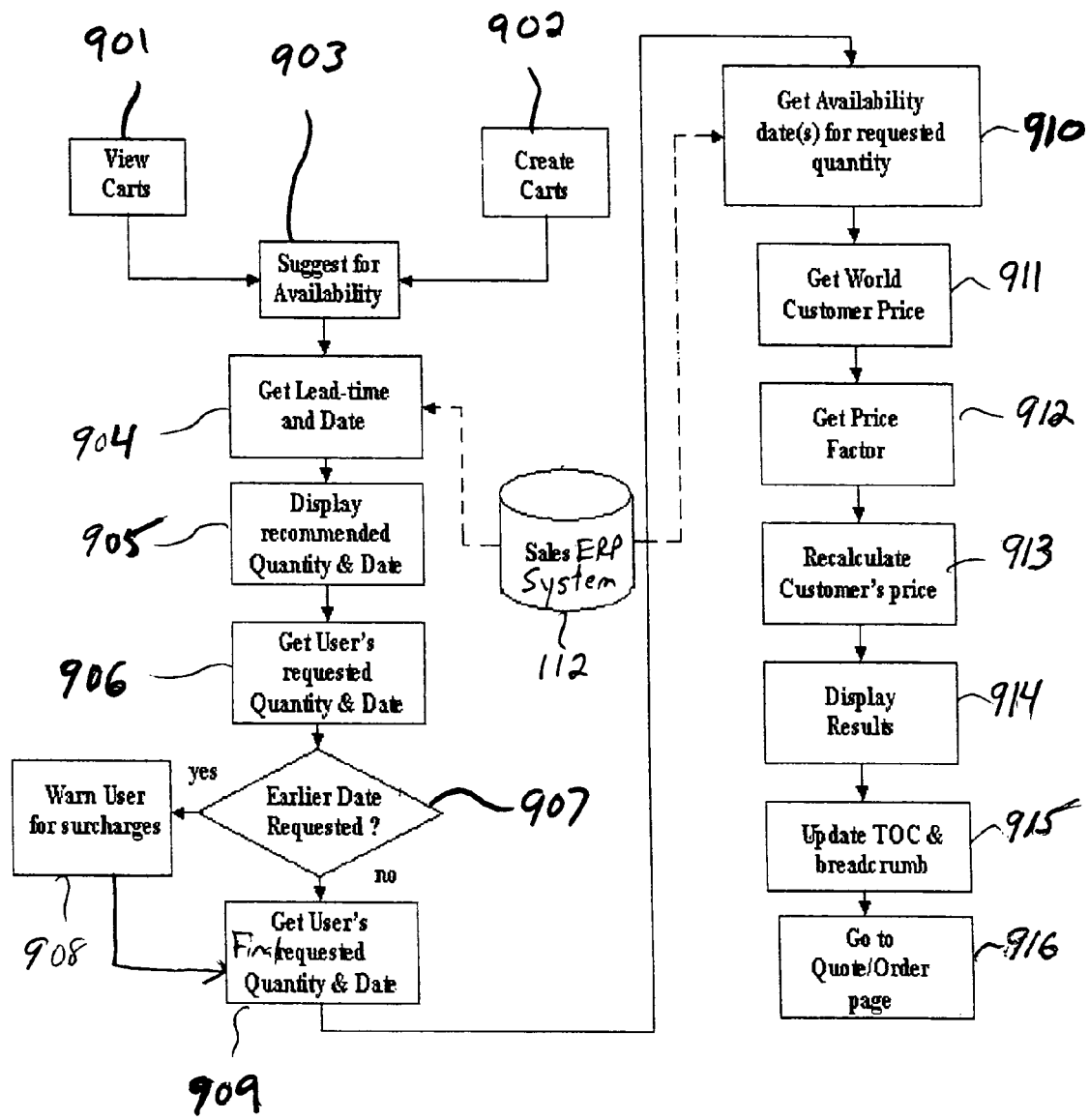
FIG. 9 illustrates methods for checking spare parts availability and price, according to exemplary embodiments of the invention.

By way of example, FIG. 9 is a flow diagram that illustrates methods for checking spare parts availability and price, according to exemplary embodiments of the invention. During a "View Carts" process (step 901) (as described below with reference to FIG. 10) or a create shopping cart process (902) (as described above with reference to FIG. 8), a user can select a check availability process (step 903) to check the price and availability of selected spare parts in a Shopping Cart. A "material availability" method is employed to communicate with the relevant backend sales ERP system(s) to obtain information such as the lead-time and forecasted date for each selected element in a Shopping Cart (step 904). The system will then display, for each selected spare part, a recommended quantity and forecasted date of delivery (step 905). The recommended quantity is obtained from the spare parts table and is used to provide the user a suggested quantity. The can change either or both the suggested (forecasted) date and suggested quantity (step 906).

Figure 14F:
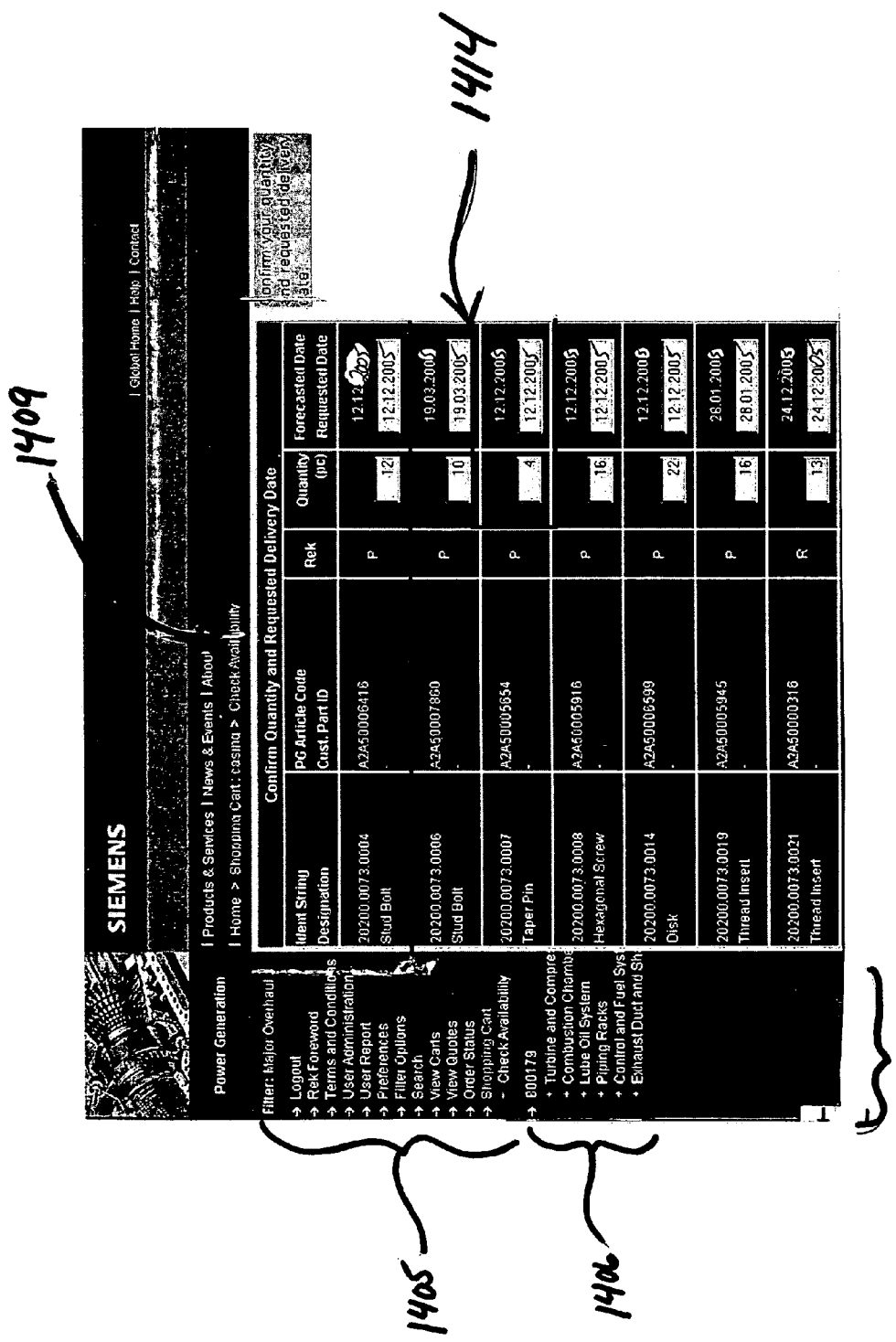

For instance, FIG. 14F illustrates an exemplary GUI screen which illustrates a user interface for confirming a quantity and requested delivery date for a check availability process, according to an exemplary embodiment of the invention. In particular, FIG. 14F illustrates a window (1414) that is displayed in response to a user selection of a "Check Availability" process for items contained in an exemplary Shopping Cart named "casing". As depicted in FIG. 14F, the exemplary window (1414) lists various types of information (e.g., identity string, designation, REK, etc.) for shopping cart elements, as well as editable fields in "quantity" and "Forecasted Date/Requested Date" columns. The editable fields allow the user to change an initially displayed suggested quantity to a user preferred quantity, as well as submit a requested date (which is different than the system's suggested (forecasted) date of delivery.

Referring again to FIG. 9, if the user requests an earlier date (affirmative determination in step 907), the system will warn the user of additional surcharges that may result from due to such request (step 908). The user can select a fixed date for the entire package of spare parts as opposed to different dates for different items. Once the user's final requested quantity and date is obtained for each element in the Shopping Cart (step 909), this information is communicated to the server, wherein a "material availability" method is invoked with the requested date(s) and/or quantities to obtain/confirm that final dates of availability for the requested quantities (step 910).

Thereafter, for each spare part element, a "price BAPI" is invoked to obtain a world customer price (step 911). The application database comprises a world price table that stores the price factor and the currency information for the country where the customer is located. The location of the customer is retrieved from the relevant ERP system(s) using a "customer details BAPI". The price factor is obtained (912) and the customer's price will be recalculated (step 913) by converting the prices specific to the customer and the preferred currency. The results and then displayed (step 914) to show the spare parts list selected along with the availability dates and the price. The TOC and breadcrumb are updated (step 915).

Figure 14G:
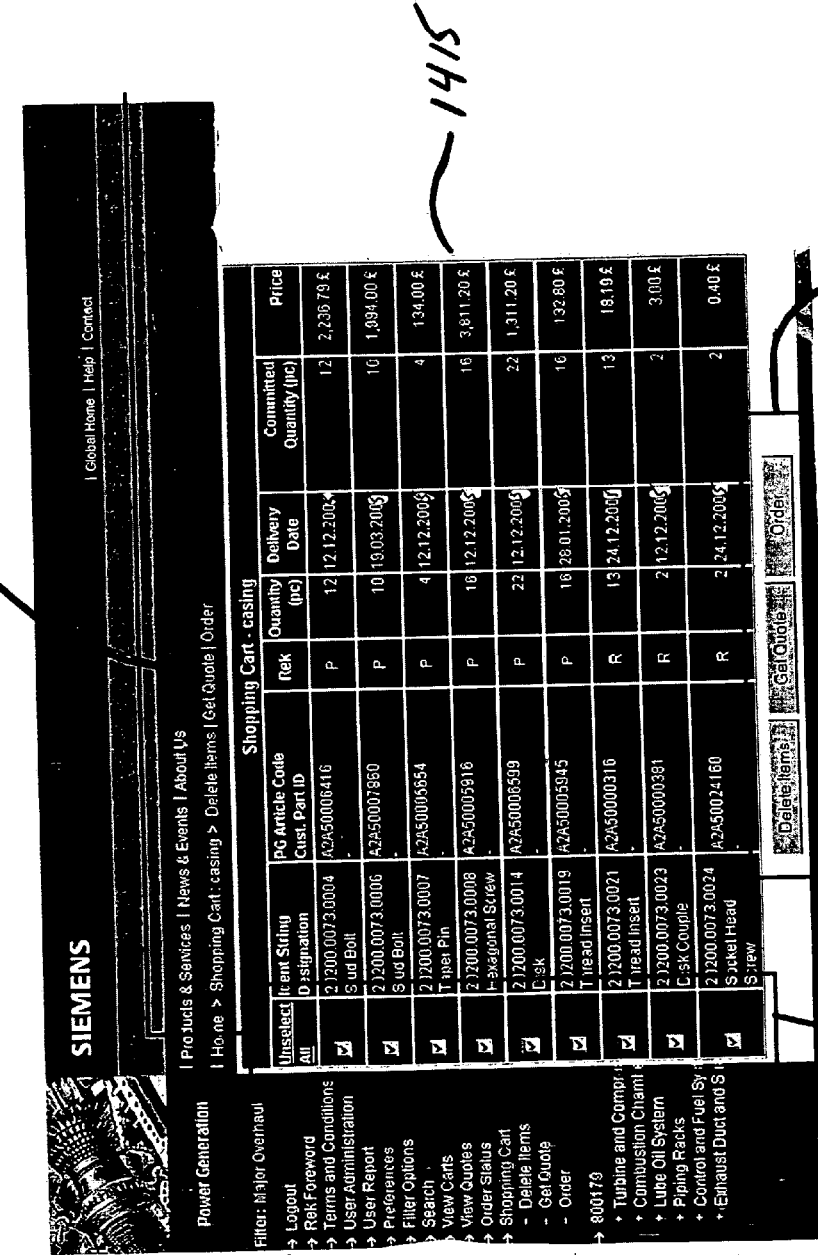

For instance, FIG. 14G illustrates contents of an exemplary Shopping Cart that is obtained after a check availability process, according to an exemplary embodiment of the invention. In particular, FIG. 14G illustrates the updated content of the exemplary Shopping Cart (1415) (named "casing") that results from a check availability process as discussed with reference to FIG. 14F. The exemplary Shopping Cart (1415) includes information such as the confirmed delivery date, committed quantity and price, for each element of the cart. From the context of the "Shopping Cart" function, the user can delete certain items, get a quote or get an order by selecting appropriate buttons (1417) or selecting listed functions in the function section (1405) of the TOC section (1400). The user can select/deselect certain items in the shopping cart (1415) via corresponding selection boxes (1416). For each selected item, the user can obtain a quote or place an order by selecting the appropriate function, in which case, the system proceeds to a Quote/Order page (step 916), which will be described with reference to the exemplary embodiments of FIGS. 11A and 11B.

Viewing Shopping Carts

Figure 10:
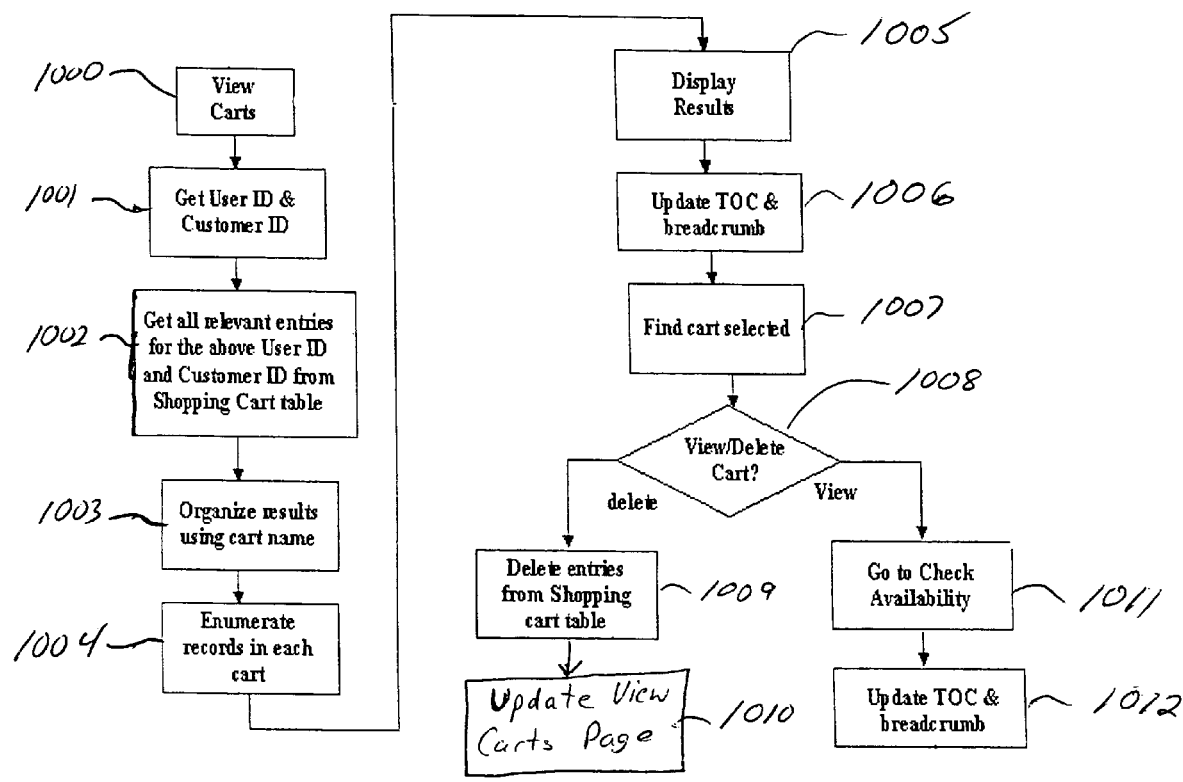
FIG. 10 illustrates a method for viewing shopping carts according to an exemplary embodiment of the invention.

A user can select a "Check Availability" function after creating or updating a Shopping Cart or when viewing a Shopping Cart. A "View Cart" function can be selected by a user to view a Shopping Cart that was created/updated from a previous session to allow further processing. For example, FIG. 10 is a flow diagram that illustrates a method for viewing Shopping Carts according to an exemplary embodiment of the invention. When a user selects a "View Carts" function listed in the functional section (1405) of a TOC section (1400) of a displayed page (step 1000), the command is communicated to the application server, whereby the user ID and the customer ID are obtained from the session information (step 1001). In addition, all records related to the user ID and customer ID are obtained from the shopping cart table in the application database (step 1002). The result set is then organized based on the Shopping Cart name (step 1003) (sorted in an alphabetical order). For each Shopping Cart, the total number of entries is determined (step 1004). The results are displayed in the main content section of the page (step 1005). The TOC and breadcrumb sections are updated (step 1006).

The user can then select one of the displayed Shopping Carts (step 1007) to either view the selected Shopping Cart or delete the selected Shopping Cart (step 1008). If the user chooses the delete Shopping Cart option, all entries are deleted from the shopping cart table that bears the selected Shopping Cart name (step 1009) and the view carts page is updated accordingly (step 1010). If the user chooses the "View Carts" option, then all entries of the selected Shopping Cart will be obtained and the system can proceed to the "check availability' process (step 1011) as discussed with reference to FIG. 9. The TOC and breadcrumb sections are updated (step 1012).

Creating an Order or Request for Quote

As noted above, exemplary embodiments of the invention includes methods for allowing end users to create quotes or orders if the user has the appropriate access privileges (as specified during creation of the user profile). In addition, quotes and orders can be created by internal sales persons on behalf of a customer. For example, FIG. 11 is a flow diagram that illustrates methods for creating quotes and orders according to exemplary embodiments of the invention.

Figure 11:
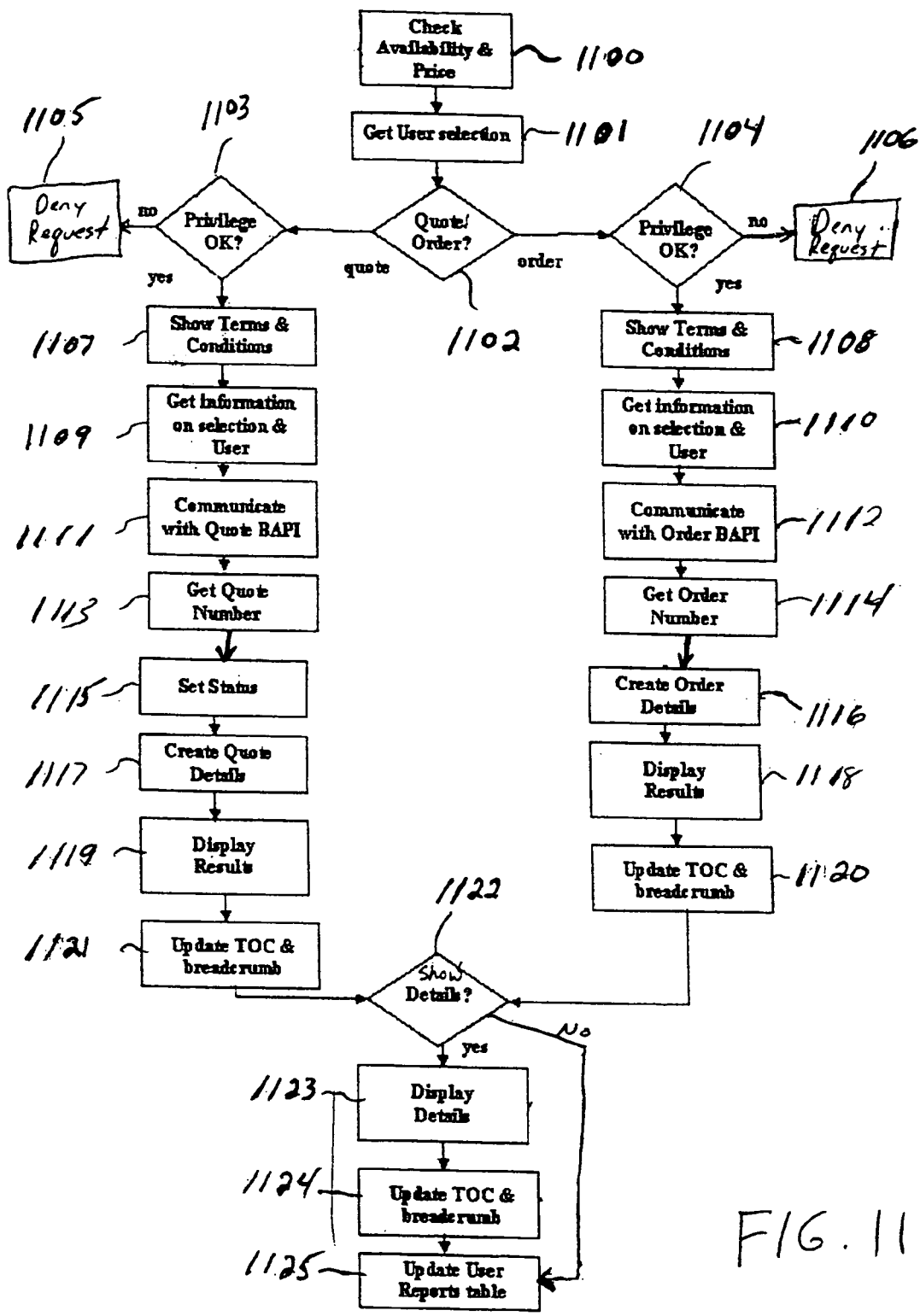
FIG. 11 illustrates methods for creating quotes and orders for spare part components according to exemplary embodiments of the invention.

Referring to FIG. 11, once a user has checked the availability and price of current items in a Shopping Cart (step 1100) (e.g., the spare parts in a currently viewed Shopping Cart or currently updated/created Shopping Cart), the results are shown to the user. The user can select/deselect one or more of the elements in the Shopping Cart (step 1101). Once the desired spare parts are selected, the user can select a "Create Quote" or "Order" function (step 1102) (such as discussed above with reference to FIG. 14G), to obtain an official quote or place an order for the selected spare parts. With either option, a determination is made as to whether the user is authorized to proceed with the quote or order (steps 1103, 1104) (i.e., check use privilege). If the user is not authorized (negative determination in steps 1103 or 1104), the user request is denied and the used is prompted accordingly (steps 1105 or 1106).

When a user is authorized to obtain a quote (affirmative determination in step 1103), the system will prompt the user to confirm that the user wants to create a quote by providing a link to regulating Terms & Conditions (step 1107). The selection (including delivery dates and price) along with the user and customer information is passed to the server (step 1109). The server will communicate all of the above information to the backend ERP system (e.g., SAP) using a quotation method (e.g., quote BAPI) (step 1111) and obtain a Sales Document number (or Quote number) that defines the quote entered in SAP (step 1113). Thereafter, the quote status will be set using the returned results (step 1115).

A details page is generated which can be used as a letter of reference by the user (step 1117), which combines all information above along with information regarding terms and condition and the validity. The results will be displayed with a list of the materials quoted, price, delivery date and the Quote Number for user reference (step 1119). In other words, a quote details document contains the user's receipt of acknowledgment, as well as the commercial terms and conditions of the quote, which can be printed. The TOC and breadcrumb are updated (step 1121).

If the user does not select the option to view the quote details page (created in step 1117) (negative determination in step 1122), the user reports table is updated to increment the number of times the user has created a quote, and increment the total price as well (step 1125). If the user selects the option to view the quote details page (affirmative determination in step 1122), the quote details page is displayed to the user (step 1123). Thereafter, the TOC and breadcrumb are updated (step 1124) and the user reports table is updated (step 1125).

Referring back to step 1102, if the user selects the "Order" option and is deemed authorized (step 1104), the terms and conditions are presented to the user to confirm the order request (step 1108). The selection (including delivery dates and price) along with the user and customer information is passed to the server (step 1110), whereby the server communicates such information to the backend ERP using a sales order method (e.g., order BAPI for SAP) (step 1112). A Sales Document number (or Order number) that defines the order entered in SAP is obtained (step 1114). The order registered in SAP is uniquely identified with the above mentioned order number.

An order details page is also created which can be used as a letter of reference by the user (step 1116). This combines all information above along with information regarding terms and condition and the validity. The results are displayed as a list of the materials ordered, price, delivery date and the Order Number for user reference (step 1118). The TOC and breadcrumb are updated (step 1120).

If the user does not select the option to view the order details page (created in step 1116) (negative determination in step 1122), the user reports table is updated to increment the number of times the user has created an order, and the total price is incremented as well (step 1125). If the user selects the option to view the order details page (affirmative determination in step 1122), the order details page is displayed to the user (step 1123). Thereafter, the TOC and breadcrumb are updated (step 1124) and the user reports table is updated (step 1125).

Displaying Quote/Order Status

Figure 12:
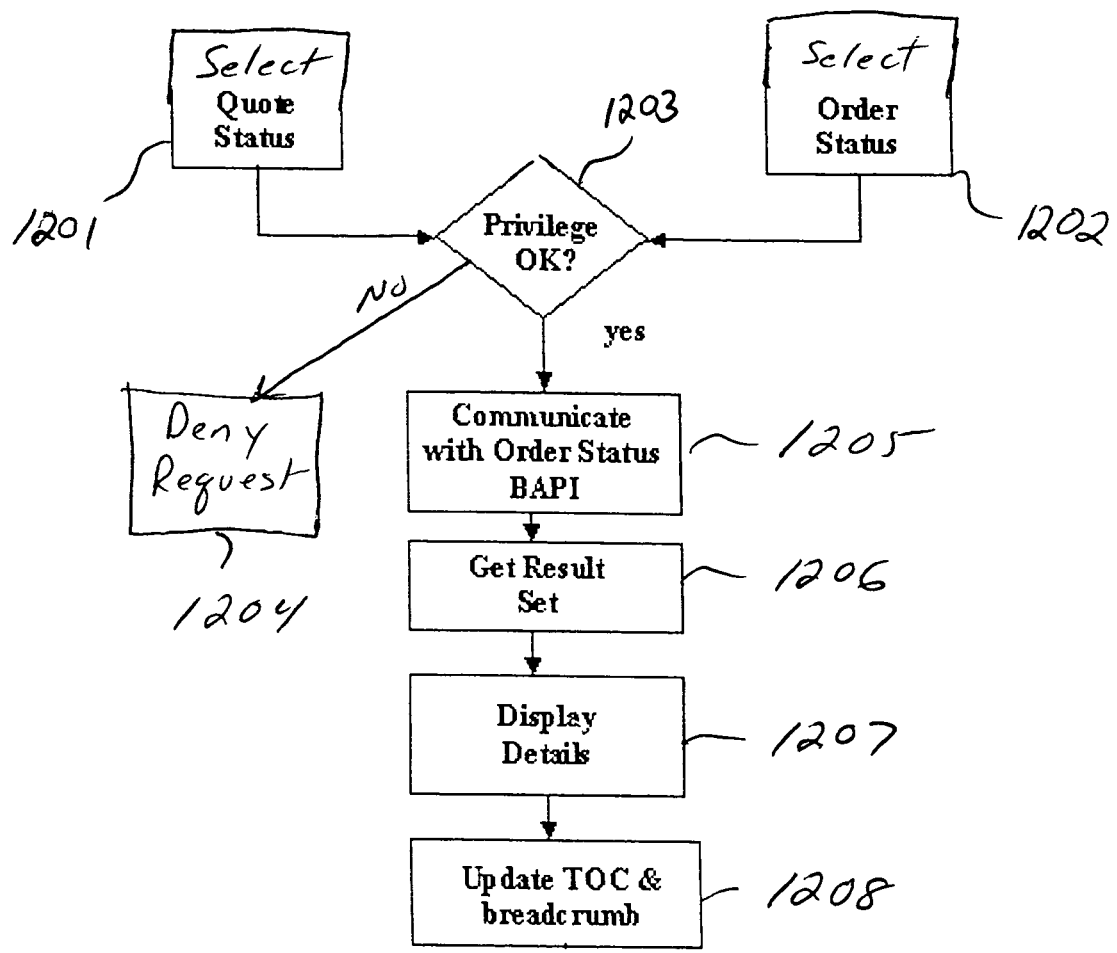
FIG. 12 illustrates methods for obtaining a quote/order status according to exemplary embodiments of the invention.

Once a quote or an order has been created, the user can subsequently view the status by obtaining such information from the backend Sales ERP system. By way of example, FIG. 12 is a flow diagram illustrating a method for obtaining a quote/order status according to an exemplary embodiment of the invention. Referring to FIG. 12, a user can select a quote status option (step 1201) or an order status option (step 1202) listed in the functional section of a TOC section of a displayed page, which selection is communicated to the application server. A determination is made as to whether the user is authorized for such status request (step 1203). If not, the user request is denied (step 1204).

If the user is authorized, the customer ID is obtained, and if the user specifies the bounding dates of interest, the bounding dates will be obtained. The application server will communicate this information to the backend Sales ERP system using an "order status" method to get the order details (step 1205). This function is used for both quote and order status options. However, the processes are flagged as different. If specified, the bounding dates are passed to the Sales ERP system, otherwise all relevant records are retrieved by the Sales ERP system (step 1205). The result set received from the Sales ERP system is displayed to the user (step 1207). Thereafter, the TOC and breadcrumb are updated (step 1208).

Editing Customer Part ID

Figure 13:
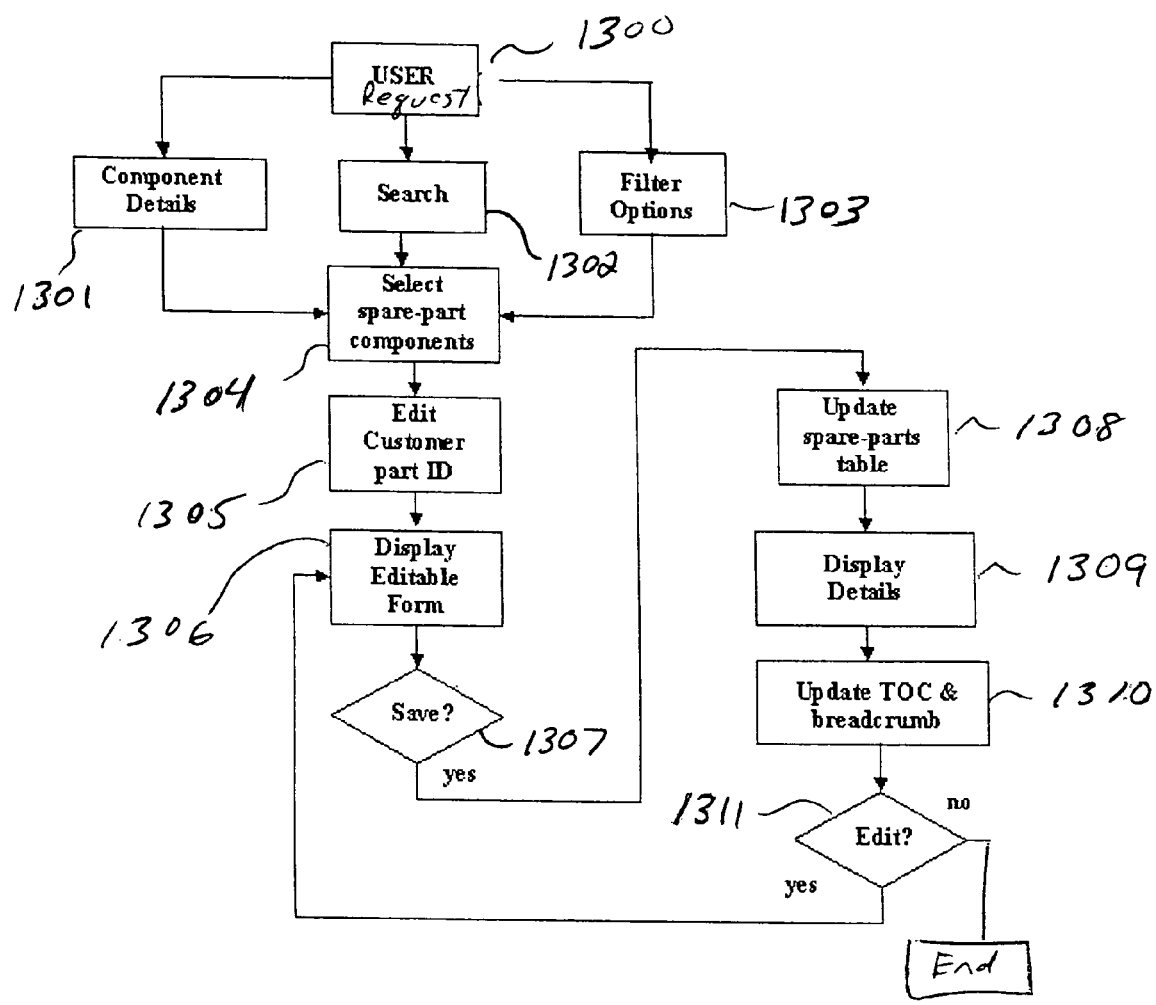
FIG. 13 illustrates a method for editing a customer part IDs according to an exemplary embodiment of the invention.

AS noted above, the system allows a customer to assign customer ID numbers to spare parts. By way of example, FIG. 13 is a flow diagram illustrating a method for editing a customer part ID according to an exemplary embodiment of the invention. The system allows the user to select elements to be updated with Customer Part ID (step 1300) from the component details page (step 1301) or the search page (step 1302) or the filter options page (step 1303). The user can select one or more spare part numbers that are listed on a given page, and the numbers of the selected components are communicated back to the application server (step 1304). The user can edit the customer part ID (step 1305). An editable form is presented to the user (step 1306) for these elements where the current customer part ID (if any has already been entered) is shown (step 1306). The user can either change the information or enter a new value and save the information (step 1307). The information is then transmitted back to the server whereby the spare-parts table in the application database is updated with the new value for the customer part ID in the corresponding column (step 1308). The results are shown to the user for user verification (step 1309). The TOC and breadcrumb are updated (step 1310). If the user wants to edit the displayed results (affirmative determination in step 1311), the process returns to step 1306) to allow the user to make further changes.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

We claim:

1. A method for generating a business application for managing and selling spare parts associated with a machine unit, the method comprising:

providing an application server comprising an application database;

receiving, by the application server, a catalog template specification of the machine unit and a filter condition corresponding to a maintenance procedure from a client device, wherein the application server and client device communicate via a commonly connected network backbone;

applying the catalog template specification to a plurality of disparate spare parts data sources to automatically extract spare parts data including at least one text file from a real-time sales spare parts data source and at least one image file and text file from a static engineering spare parts data source according to the catalog template specification;

generating spare parts catalog content by integrating the at least one text file from the real-time sales spare parts data source and the at least one image file and text file from the static engineering spare parts data source into a common structure according to the catalog template specification and generating hyperlinks between the at least one image file and text file from the static engineering spare parts data source according to a hyperlink specification;

generating a spare parts package including one or more spare parts, wherein the one or more spare parts are utilized in the maintenance procedure; and publishing a subset of the spare parts catalog content corresponding to the one or more spare parts included in the spare parts package to the application database.

2. The method of claim 1, wherein the catalog template is an XML template and wherein the catalog content is represented by a plurality of linked XML documents.

3. The method of claim 2, wherein applying a catalog template to one or more disparate sources of spare part data comprises applying the catalog template to one or more business information systems.

4. The method of claim 2, wherein generating spare parts catalog content comprises:

generating a spare parts document for each component of a machine unit, wherein the spare parts document for each component is an XML file that describes the component and includes information regarding subcomponents of the component; and generating a TOC (table of contents) document for the spare parts documents, wherein the TOC document is an XML file that includes an index of the spare parts documents for the machine unit.

5. The method of claim 4, further comprising generating a top level document for the machine unit, wherein the top level document is an XML file that includes an index of all files that are associated with the machine unit.

6. The method of claim 4, wherein generating the spare parts documents comprises extracting BOM (Bill of Material) information associated with the machine unit from a structured data source.

7. The method of claim 4, further comprising grouping the spare parts documents based on electronic survey drawings associated with the machine unit.

8. The method of claim 4, further comprising mapping content of the spare parts documents to a relational database.

9. The method of claim 4, wherein publishing the spare parts catalog content to the application database comprises:

generating a spare parts table to map spare parts catalog content to the spare parts documents; and generating a components table to map spare parts catalog content to the spare parts table; and storing the spare parts table and components table in the application database.

10. The method of claim 9, wherein generating the spare parts table includes mapping the published spare parts documents to a relational database.

11. The method of claim 1, wherein generating spare parts catalog content comprises generating meta information to link corresponding spare parts data from disparate data sources.

12. The method of claim 1, wherein the spare parts catalog content includes meta information to support hyperlinked navigation between spare part components and corresponding graphic illustrations.

13. The method of claim 1, further comprising generating one or more business logic programs that enable user interaction with the spare part catalog content, wherein user interaction includes navigation and retrieval of spare parts data, requesting quotes and availability of spare parts and ordering spare parts.

14. The method of claim 13, wherein the business logic programs support real-time access of spare parts information from backend business information systems.

15. A computer readable medium embodying instructions executed by a processor to perform method steps for generating a business application for managing and selling spare parts associated with a machine unit, the method steps comprising:

receiving a catalog template specification of the machine unit and a global filter condition corresponding to a maintenance procedure;

applying the catalog template specification to a plurality of disparate spare parts data sources to automatically extract spare parts data including at least one text file from a real-time sales spare parts data source and at least one image file and text file from a static engineering spare parts data source according to the catalog template specification;

generating spare parts catalog content by integrating the at least one text file from the real-time sales spare parts data source and the at least one image file and text file from the static engineering spare parts data source into a common structure according to the catalog template specification and generating hyperlinks between the at least one image file and text file from the static engineering spare parts data source according to a hyperlink specification;

generating a spare parts package including one or more spare parts, wherein the one or more spare parts are utilized in the maintenance procedure;

publishing the spare part catalog content to an application database; and adding a spare part to a shopping cart, automatically, upon a user viewing the spare part, and upon determining that the spare part is included in the spare parts package.

16. The computer readable medium of claim 15, wherein the catalog template is an XML template and wherein the catalog content is represented by a plurality of linked XML documents.

17. The computer readable medium of claim 16, wherein the instructions for applying a catalog template to one or more disparate sources of spare part data comprise instructions for applying the catalog template to one or more business information systems.

18. The computer readable medium of claim 16, wherein the instructions for generating spare parts catalog content comprise instructions for:

generating a spare parts document for each component of a machine unit, wherein the spare parts document for each component is an XML file that describes the component and includes information regarding subcomponents of the component; and generating a TOC (table of contents) document for the spare parts documents, wherein the TOC document is an XML file that includes an index of the spare parts documents for the machine unit.

19. The computer readable medium of claim 18, further comprising instructions for generating a top level document for the machine unit, wherein the top level document is an XML file that includes an index of all files that are associated with the machine unit.

20. The computer readable medium of claim 18, wherein the instructions for generating the spare parts documents comprise instructions for extracting BOM (Bill of Material) information associated with the machine unit from a structured data source.

21. The computer readable medium of claim 18, further comprising instructions for grouping the spare parts documents based on electronic survey drawings associated with the machine unit.

22. The computer readable medium of claim 18, further comprising instructions for mapping data contained in the spare parts documents to a relational database.

23. The computer readable medium of claim 18, wherein the instructions for publishing the spare part catalog content to the application database comprise instructions for:
   generating a spare parts table to map spare parts catalog content to the spare parts documents; and
   generating a components table to map spare parts catalog content to the spare parts table; and
   storing the spare parts table and components table in the application database.

24. The computer readable medium of claim 23, wherein the instructions for generating the spare parts table includes instructions for mapping the spare parts documents to a relational database.

25. The computer readable medium of claim 15, wherein the instructions for generating spare parts catalog content comprise instructions for generating meta information to link corresponding spare parts data from disparate data sources.

26. The computer readable medium of claim 15, wherein the spare parts catalog content includes meta information to support active links between spare part components and corresponding graphic illustrations.

* * * * *